United States Patent
McBride et al.

(10) Patent No.: US 9,189,800 B2
(45) Date of Patent: Nov. 17, 2015

(54) METHOD AND SYSTEM FOR SELECTION, FILTERING OR PRESENTATION OF AVAILABLE SALES OUTLETS

(71) Applicant: TrueCar, Inc., Santa Monica, CA (US)

(72) Inventors: Jason McBride, Santa Monica, CA (US); Thomas J. Sullivan, Santa Monica, CA (US); Michael D. Swinson, Santa Monica, CA (US); Zixia Wang, Santa Monica, CA (US)

(73) Assignee: TRUECAR, INC., Santa Monica, CA (US)

( * ) Notice: Subject to any disclaimer, the term of this patent is extended or adjusted under 35 U.S.C. 154(b) by 0 days.

(21) Appl. No.: 14/488,062

(22) Filed: Sep. 16, 2014

(65) Prior Publication Data

US 2015/0006250 A1    Jan. 1, 2015

Related U.S. Application Data

(63) Continuation of application No. 13/534,930, filed on Jun. 27, 2012, now Pat. No. 8,868,480.

(60) Provisional application No. 61/504,017, filed on Jul. 1, 2011.

(51) Int. Cl.
*G06N 7/00* (2006.01)
*G06Q 30/02* (2012.01)
*G06Q 30/06* (2012.01)
(Continued)

(52) U.S. Cl.
CPC ........ *G06Q 30/0202* (2013.01); *G06Q 30/0601* (2013.01); *G06Q 30/08* (2013.01); *G06N 5/02* (2013.01); *G06Q 30/0254* (2013.01)

(58) Field of Classification Search
None
See application file for complete search history.

(56) References Cited

U.S. PATENT DOCUMENTS

| 5,842,178 A | 11/1998 | Givannoli |
| 6,029,141 A | 2/2000 | Bezos et al. |
| 6,041,310 A | 3/2000 | Green |

(Continued)

FOREIGN PATENT DOCUMENTS

| WO | WO 01/40898 A2 | 6/2001 |
| WO | WO 01/40898 A3 | 11/2007 |
| WO | 2010030632 | 3/2010 |

OTHER PUBLICATIONS

Scott, et al., A Nested Hidden Markov Model for Internet Browsing Behavior, Marshall School of Business, 2006, pp. 1-26.*

(Continued)

*Primary Examiner* — Wilbert L Starks
(74) *Attorney, Agent, or Firm* — Sprinkle IP Law Group

(57) ABSTRACT

Embodiments disclosed herein provide systems and methods for the filtering, selection and presentation of vendors accounting for both user characteristics and vendor characteristics, such that the systems and methods may be used by both customer and vendor alike to better match customer needs with the resource-constrained vendors with whom a successful sale has a higher probability of occurring. Embodiments may include filtering, selecting and/or presenting vendors to a user sorted by the probability that the particular vendor will possess the characteristics that appeal to a particular customer and therefore result in a large probability of sale and suppress presentation of those vendors that are unlikely to be selected by the customer since their characteristics are less consistent with those needed by the customer and, therefore, are unlikely to result in a sale.

20 Claims, 9 Drawing Sheets

(51) Int. Cl.
*G06Q 30/08* (2012.01)
*G06N 5/02* (2006.01)

(56) References Cited

U.S. PATENT DOCUMENTS

| | | |
|---|---|---|
| 6,868,389 B1 | 3/2005 | Wilkins |
| 6,882,983 B2 | 4/2005 | Furphy et al. |
| 6,892,185 B1 | 5/2005 | Van Etten et al. |
| 7,050,982 B2 | 5/2006 | Sheinson |
| 7,392,224 B1 | 6/2008 | Bauer et al. |
| 7,546,243 B2 | 6/2009 | Kapadia et al. |
| 7,596,501 B2 | 9/2009 | Tivey et al. |
| 7,599,842 B2 | 10/2009 | Tivey et al. |
| 7,676,400 B1 | 3/2010 | Dillon |
| 7,747,474 B2 | 6/2010 | Miloslavsky et al. |
| 7,801,798 B1 | 9/2010 | Huemer et al. |
| 7,818,201 B2 | 10/2010 | Shevlin et al. |
| 8,000,989 B1 | 8/2011 | Kiefhaber et al. |
| 8,078,515 B2 | 12/2011 | John |
| 8,429,220 B2 | 4/2013 | Wilkinson et al. |
| 8,515,817 B2 | 8/2013 | Noy et al. |
| 8,589,250 B2 | 11/2013 | Noy |
| 8,868,480 B2 | 10/2014 | McBride et al. |
| 2001/0037205 A1 | 11/2001 | Joao |
| 2001/0037265 A1 | 11/2001 | Kleinberg |
| 2002/0111856 A1 | 8/2002 | Messer et al. |
| 2002/0147625 A1 | 10/2002 | Kolke, Jr. |
| 2003/0105728 A1 | 6/2003 | Yano et al. |
| 2003/0171964 A1 | 9/2003 | Center |
| 2003/0200156 A1 | 10/2003 | Roseman et al. |
| 2003/0229577 A1 | 12/2003 | Nabel |
| 2004/0014454 A1 | 1/2004 | Burgess |
| 2004/0143473 A1 | 7/2004 | Tivey et al. |
| 2004/0143476 A1 | 7/2004 | Kapadia et al. |
| 2004/0143482 A1 | 7/2004 | Tivey et al. |
| 2005/0108112 A1 | 5/2005 | Ellenson |
| 2005/0159996 A1 | 7/2005 | Lazarus et al. |
| 2005/0171859 A1 | 8/2005 | Harrington |
| 2005/0209934 A1 | 9/2005 | Irby et al. |
| 2005/0234688 A1 | 10/2005 | Pinto et al. |
| 2005/0261951 A1 | 11/2005 | Tighe |
| 2006/0085283 A1 | 4/2006 | Griffiths |
| 2006/0106668 A1 | 5/2006 | Kim et al. |
| 2006/0129423 A1 | 6/2006 | Sheinson |
| 2006/0200360 A1 | 9/2006 | Razletovskiy |
| 2006/0212355 A1 | 9/2006 | Teague et al. |
| 2007/0112582 A1 | 5/2007 | Fenlon |
| 2007/0130090 A1 | 6/2007 | Staib et al. |
| 2007/0143345 A1 | 6/2007 | Jones et al. |
| 2007/0219851 A1 | 9/2007 | Taddei et al. |
| 2007/0226081 A1 | 9/2007 | Vilcauskas |
| 2007/0244797 A1 | 10/2007 | Hinson |
| 2008/0091443 A1 | 4/2008 | Strope et al. |
| 2008/0201203 A1 | 8/2008 | Rose et al. |
| 2008/0255965 A1 | 10/2008 | Milton |
| 2008/0288361 A1 | 11/2008 | Rego et al. |
| 2008/0300962 A1 | 12/2008 | Cawston |
| 2008/0306812 A1 | 12/2008 | Bowen et al. |
| 2008/0306848 A1 | 12/2008 | Bartholomew |
| 2009/0006118 A1 | 1/2009 | Pollak |
| 2009/0018888 A1 | 1/2009 | Zamani |
| 2009/0037356 A1 | 2/2009 | Rothstein et al. |
| 2009/0048859 A1 | 2/2009 | McCarthy et al. |
| 2009/0089149 A1 | 4/2009 | Lerner et al. |
| 2009/0164338 A1 | 6/2009 | Rothman |
| 2009/0171761 A1 | 7/2009 | Noy et al. |
| 2009/0254454 A1 | 10/2009 | Gupta |
| 2009/0276291 A1 | 11/2009 | Wannier et al. |
| 2009/0287534 A1 | 11/2009 | Guo et al. |
| 2009/0287595 A1 | 11/2009 | Hanifi |
| 2010/0153184 A1 | 6/2010 | Caffrey et al. |
| 2010/0161379 A1 | 6/2010 | Bene et al. |
| 2010/0183132 A1 | 7/2010 | Satyavolu et al. |
| 2010/0293070 A1 | 11/2010 | Kopelman et al. |
| 2011/0161197 A1 | 6/2011 | Noy et al. |
| 2011/0178863 A1 | 7/2011 | Daigle |
| 2011/0191264 A1 | 8/2011 | Inghelbrecht |
| 2012/0179476 A1 | 7/2012 | Muncy |
| 2013/0006916 A1 | 1/2013 | Mcbride et al. |
| 2013/0311341 A1 | 11/2013 | Noy et al. |
| 2014/0032272 A1 | 1/2014 | Noy |
| 2014/0180882 A1 | 6/2014 | Berger et al. |

OTHER PUBLICATIONS

International Search Report and Written Opinion for PCT Application No. PCT/US2013/076987, mailed Apr. 14, 2014, 7 pgs.
Office Action for U.S. Appl. No. 14/137,178, mailed Oct. 22, 2014, 8 pgs.
Goldberg, "Job Security through PPC-CRM Integration", paydigest.com, published Aug. 22, 2007.
Sauberlich, et al. "Analytical Lead Management in the Automotive Industry," Data Analysis and Decision Support, Springer Heidelberg Berlin 2005, pp. 290-299.
Office Action for U.S. Appl. No. 11/968,137, mailed Dec. 23, 2010, 8 pgs.
Office Action for U.S. Appl. No. 11/968,137, mailed Jun. 9, 2011, 9 pgs.
Office Action for U.S. Appl. No. 11/968,137, mailed Dec. 19, 2011, 10 pgs.
Collins, Gregory M., "Technology Opens Up Huge CRM Opportunities for Retailers," Jun. 10, 2002, retrieved from <http://www.destinationcrm.com/Articles/PrintArticle.aspx?ArticleID=47419>, 3 pgs.
Gibbs, Rick, "How Google Base Replaces Autos Classifieds", Nov. 27, 2006, retrieved from <http://www.imediaconnection.com/printpage.aspx?id=12548.asp>, 4 pgs.
No Author, "3 Reasons Why Using Google Pays Off for Automobile Dealers," 2005, retrieved from <http://www.kaistudios.com/PPC/guides/Google-autodealers.htm>, 2 pgs.
Office Action for U.S. Appl. No. 13/942,375, mailed Nov. 20, 2013, 12 pgs.
Office Action for U.S. Appl. No. 13/942,375, mailed Jun. 12, 2014, 17 pgs.
Office Action in U.S. Appl. No. 13/942,375, mailed Oct. 6, 2014, 6 pgs.
International Preliminary Report on Patentability for PCT Application No. PCT/US13/76987, mailed Jan. 7, 2015, 22 pgs.
Lead generation—buy top quality sales leads from car buyers, retrieved from the Internet on Oct. 20, 2009:<URL: http://partner.askaprice.com/buy_leads/>, 2 pgs.
Used and New Car Leads for Car Dealers—Special Budget friendly . . . Retrieved from the Internet on Oct. 20, 2009:<URL: http://www.automotiveleads.com>, 2 pgs.
Painter, Scott, Car Sales Lead Generation: Broken for Consumers, Broken for Dealers, E-Commerce Times, Sep. 15, 2008, printed from the Internet on Oct. 20, 2009 <URL: http://www.crmbuyer.com/story/64475.html?wlc=1256049248>, 4 pgs.
Office Action for U.S. Appl. No. 12/655,462, mailed May 21, 2012, 10 pgs.
International Search Report and Written Opinion for PCT Application No. PCT/US2012/044416, mailed Sep. 12, 2012, 11 pgs.
Office Action for U.S. Appl. No. 12/655,462, mailed Sep. 11, 2012, 13 pgs.
Office Action for U.S. Appl. No. 12/655,462, mailed Dec. 26, 2012, 13 pgs.
Office Action for U.S. Appl. No. 12/655,462, mailed Mar. 29, 2013, 14 pgs.
International Preliminary Report on Patentability (IPRP) for PCT Patent Application No. PCT/US2012/044416, mailed Jan. 16, 2014, 10 pgs.
Notice of Allowance for U.S. Appl. No. 13/534,930, mailed Jun. 5, 2014, 9 pgs.
Kim, Jae Kyeong et al., A Hybrid Recommendation Procedure for New Items Using Preference Boundary, ICEC '09 Proceedings of the 11th Int'l Conf. on Electronic Commerce, 2009, pp. 289-295.

(56) References Cited

OTHER PUBLICATIONS

Office Action in U.S. Appl. No. 14/043,242, mailed Feb. 26, 2015, 11 pgs.

Office Action issued for U.S. Appl. No. 13/942,375, mailed Mar. 18, 2015, 6 pages.

European Search Report issued for European Patent Application No. 12 808 024.9, mailed Mar. 26, 2015, 10 pages.

Final Office Action issued for U.S. Appl. No. 14/137,178, May 26, 2015, 11 pages.

* cited by examiner

600

Price Certificate: 2382123679

Your price is protected at these dealerships below.

Take this printed Price Certificate to the dealership and pick up your vehicle.
*You're never obligated to make a purchase.*

610

⚠ Metro Ford – closest dealer
   Learn More »

23.5 miles from South Dartmouth, MA
1651 Newstate Hwy
Raynham, MA 02767
Get Directions »

Contact Info
John Doe
(555) 555-5555

Send Email »

STICKER PRICE: ~~$30,095~~
YOUR PRICE: $25,379

This dealer has agreed to price your deal relative to the Factory Invoice Price. Their offer is:

$3,500 Below Factory Invoice
(Includes Incentives)

| Factory Invoice: | $28,879 |
| Dealer Offer: | -$3,500 |
| Your Price: | $25,379 |

How your price works

💡 Tip: All of these dealers have agreed to price their models relative to the Factory Invoice price.

Example:

| Factory Invoice: | $28,879 |
| Dealer Offer: | -$3,501 |
| Your Price: | $25,378 |

© TrueCar, Inc

*FIG. 6A*

METHOD AND SYSTEM FOR SELECTION, FILTERING OR PRESENTATION OF AVAILABLE SALES OUTLETS

CROSS-REFERENCE TO RELATED APPLICATIONS

This application is a continuation of and claims a benefit of priority under 35 U.S.C. §120 to U.S. patent application Ser. No. 13/534,930, filed Jun. 27, 2012, entitled "METHOD AND SYSTEM FOR SELECTION, FILTERING OR PRESENTATION OF AVAILABLE SALES OUTLETS," which claims a benefit of priority under 35 U.S.C. §119 to U.S. Provisional Application No. 61/504,017, filed Jul. 1, 2011, entitled "METHOD AND SYSTEM FOR SELECTION, FILTERING OR PRESENTATION OF AVAILABLE SALES OUTLETS," which are fully incorporated herein by reference in their entireties.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to the presentation of sales outlets to a customer. In particular, this disclosure relates to the selection, filtering and/or presentation of sales outlets, taking into account user characteristics as well as characteristics of such sales outlets.

BACKGROUND

There can be many types of sales outlets. One example of a sales outlet can be a retailer that sells a particular product or service. Another example can be a vendor or supplier that provides goods and/or services to businesses or individuals. As a specific example, in a supply chain a manufacturer may manufacture products, sell them to a vendor, and the vendor may in turn sell a product to a consumer. In this context, the term 'vendor' refers to the entity that sold the product to the consumer.

Today, it is possible for a consumer to locate a vendor by browsing various Web sites associated with different vendors. Existing search engines allow a consumer to search online for a desired product. These search engines then return a list of vendors, often in the form of 'hot links', to the consumer.

However, the search results can have varying degrees of relevance to the desired product and/or the consumer. Consequently, there is always room for innovations as well as improvements.

SUMMARY OF THE DISCLOSURE

Consumers are becoming savvier. This is especially true in the context of online purchasing, where research is easily accomplished. Consumers have therefore taken to searching for products or sales outlets (also referred to as vendors, sellers, dealers, etc.) online before executing a purchase. As the popularity of searching for products or vendors online before a customer executes a purchase continues to grow, there is an increasing need to develop systems and methods for presenting candidate vendors based on a user's preference. However, when a user seeks a vendor from which he/she can make a purchase of a product (which may be an onsite purchase or an online purchase), the candidate vendors may have characteristics that may cause the user to prefer some vendors over others. In fact, certain characteristics may result in the likelihood of sale for some vendors to be small, negligible, or non-existent. Similarly, different features of a consumer may also result in a difference in the probability of the consumer buying from a particular vendor.

However, in the current realm of online commerce, effective systems and methods for the filtering, selection or presentation (collectively referred to as filtering) of vendors are lacking. Common approaches include listing all possible vendors (sometimes with an ability to sort by price, relevance, or other feature) or allowing the user to filter results by price, distance, or other product attribute.

Additionally, vendors also experience similar prioritization difficulties as they receive large numbers of leads that often overwhelm the resources available to pursue potential customers (used interchangeably herein with the term consumer). To efficiently identify the consumers more likely to purchase the item in which they expressed interest from those less likely to purchase, a ranking procedure for consumers may also be needed.

Therefore, it is desired that systems and methods for the filtering, selection and/or presentation of vendors account for both user characteristics and vendor characteristics, such that the systems and methods may be used by both consumers and vendors alike to better match consumer needs with the resource-constrained vendors with whom a successful sale has a higher probability of occurring. It is also desired that systems and methods for the filtering, selection and presentation of vendors address the bilateral decision process by matching highly interested consumer(s) to the correct and best vendor(s) according to the features from both sides.

Embodiments of systems and methods for the filtering, selection and/or presentation of vendors may (a) present a ranked list of candidate vendors sorted by the probability that a particular vendor will possess the characteristics that appeal to a particular consumer and therefore result in a higher probability of sale which may, in one embodiment, maximize an expected revenue for an intermediary and (b) suppress presentation of those vendors that are unlikely to be selected by the consumer since their characteristics are less consistent with those needed by the consumer and, therefore, are unlikely to result in a sale. The same logic should be applied to vendors for selecting potential customers as well. Therefore, this seeks to identify the ideal pairing of an online user and a vendor.

Embodiments of such systems and methods may also work in two directions to filter based on vendors with high probability of sale to consumers and to select highly interested consumers to vendors. The filtering and sorting can be based on observed data based on aggregate behavior of individuals sharing search characteristics similar to those in the same set, S (membership in S can be based on geographic proximity or other shared characteristics), searching for product t. Similarly, the algorithm does not require vendor's pre-determined rules for customer selection. It uses statistical modeling method by presenting the most valuable customer to vendors and saving vendor's resources and maximum vendors' expected revenue at the same time.

Embodiments as disclosed herein may have the advantages of taking into account a richer set of vendor and user attributes and leveraging empirically-based information to compute a probability of closing a sale and to identify those features which are most heavily considered during the buying decision process. In particular, certain embodiments may provide the advantages of:

1) Empirically determining the probability of sale using historical data, and
2) Not being limited to features related to distance, price, and historical sales activity by including, for example, additional factors like drive time, dealer density, available inventory, perks, customer loyalty.

Some embodiments may further rank or filter the set of vendors based on an expected revenue. For example, an embodiment may rank the set of vendors based on, for each vendor within a geographic area, the probability of sale and an expected revenue thus generated for yet another entity.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIGS. 4, 5, 6a and 6b depict representations of screenshots utilized for presenting sales outlets;

DETAILED DESCRIPTION

Figure 1:
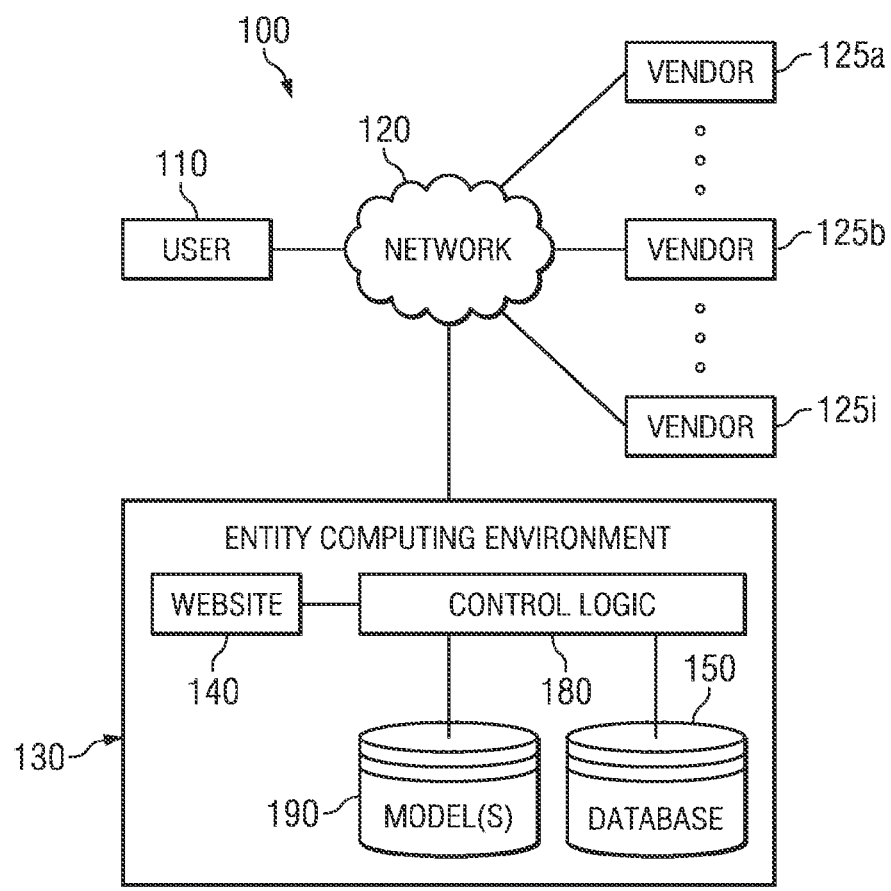
FIG. 1 depicts a simplified diagrammatic representation of one example embodiment of a system for presenting sales outlets.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Embodiments of the systems and methods disclosed herein may determine the probability of sale given that a vendor is presented to an online user interested in purchasing a product. This probability may be used in the selection, filtering or presentation (collectively referred to as filtering herein) of vendors to the user.

For example, in one embodiment the probability of sale, $P_s$, from a user's perspective has two components:

1) A component reflecting various features of an individual vendor and its product offering including price, available inventory, perks offered by the vendor, historical sales performance, etc.
2) A component reflecting the same features but expressed relative to the other vendors that will also be co-displayed.

This process of filtering a list of vendors can be extended to additionally benefit the vendors. The complementary action would be for vendors to apply a filter to a list of users who generated the online interest and focus their attention on those users (potential customers) who have the higher probabilities of buying the product. This filter could be used, for example, when the availability of a vendor's resources (e.g., sales persons, e-mail responders, etc.) available to pursue interested users is insufficient to provide balanced attention to all the users for whom the vendor appeared in an online product search.

The probability of buying, $P_b$, from a vendor's perspective may also have two components:

1) A component reflecting various demographic features of an individual customer including income, family size, net worth, their distance from the vendor, historical buying frequency, historical buying preferences, etc.
2) Features describing the interactions of a particular customer and a particular vendor including the vendor's historical sales to that customer (a proxy for loyalty), historical sales to others in the customer's local area/neighborhood, vendor's location to that customer. In case of large, durable goods which require buyer's onsite visit, the distance to the vendor is an additional interaction factor for the customer.

The bilateral decision process can be combined into a single metric, the probability of closing a sale:

$$P_c = f(P_s, P_b)$$

This probability can be used by customer and vendor alike to better match customer needs with the resource-constrained vendors with whom a successful sale has a higher probability of occurring. Systems and methods may thus provide a benefit to both users and vendors by simplifying customer search time, increasing vendors' profit by presenting "correct" products and services to their target customers, and allocating sales resources to customers more likely to yield a sale.

More specifically, according to certain embodiments the probability of closing a sale can be decomposed to two parts as probability of sell to a customer and probability of buy from a vendor. From a customer's perspective, the probability of vendor i sell product t given they were presented in a set of other vendors, S, is computed based on a logistic regression equation of the form:

$$P_s = P_{i,t,S} = \frac{1}{1+e^{-\theta_{i,t,S}}}$$

where
$\theta_{i,t,S} = \beta_o + \beta_1 X_{i,t,1} + \beta_2 X_{i,t,2} + \ldots + \beta_m X_{i,t,m} + \beta_q X_{i,t,S,q} + \beta_{q+1} X_{i,t,S,q+1} + \ldots + \beta_r X_{i,t,S,r} + \epsilon_{i,t,S}$, each $X_{i,t,k}$ (k=1, ..., m) reflects a feature of vendor i with respect to product t each $X_{i,t,S,q}$ (q=m+1, ..., r) reflects a feature of vendor i with respect to product t and the other vendors presented along with vendor i in set S.

From vendor i's perspective, the probability of customer c making a purchase on product t from the vendor can be computed by the logistic regression equation of:

$$P_b = P_{c,t,i} = \frac{1}{1+e^{-\delta_{c,t,i}}}$$

where
$\delta_{c,t,i} = \alpha_o + \alpha_1 Y_{c,t,1} + \alpha_2 Y_{c,t,2} + \ldots + \alpha_n Y_{c,t,n} \alpha_q Y_{c,i,q} + \alpha_{q+1} Y_{c,i,q+1} + \ldots + \alpha_r Y_{c,i,r} + \epsilon_{c,t,U}$, each $Y_{c,t,k}$ (k'=1, ..., n') reflects a feature of customer c interested in product t each $Y_{c,i,q}$ (q'=n+1, ..., r') reflects a feature of customer c's historical buying behavior from vendor i.

Rather than consider each component separately and because the bilateral decision process implies interaction between the buyer and seller, in some embodiments, a single value can be computed that considers the match of customer and vendors based on the logistic function:

$$P_c = f(P_s, P_b) = \frac{1}{1+e^{-(\theta_{i,t,S}+\delta_{c,t,i})}}$$

Logistic regression is a statistical method used for prediction of the probability of occurrence of an event by fitting data to a logic function. It is an empirically-based statistical method for modeling binomial outcome (sale vs. no sale).

Independent variables reflecting 1) individual vendor features, 2) individual vendor features relative to other vendors, 3) individual customer features, and 4) customer's historical preference may be proposed as potential factors based on empirical knowledge of their relationship with closing a sale.

In some embodiments, data transformations may be used for variables with large variance or skewed distribution. Missing values may be imputed based on appropriate estimates such as using local average of historical data. In some embodiments, forward, backward and stepwise model selection procedures available in statistical analysis software (SAS Proc Logistic, for example) may be used to select independent variables. Rescaled or additional derived variables can also be defined in order to reduce the variance of certain variables and increase the robustness of coefficient estimates. The final model coefficients may be chosen such that the resulting estimate probability of sale is consistent with the actual observed sales actions given the vendors displayed historically.

In one embodiment, cross-validation can be performed to test the consistency of the model estimates. The final dataset is randomly split into two groups for refitting the model. The purpose of this is to test if the model estimates are robust among different sampling groups. Due to changes in market environment, customer behaviors, dealer features over time, the final model may also be subject to other type of cross validation. For example, if the final model data source is collected in a long time interval, the final dataset can be split to half by time. The final model will then be refitting to the both "before" and "after" sample to test the consistency of coefficients over time.

It will be apparent that there is a wide variety of uses for such a model and algorithms. For example, in one embodiment, such models and algorithms can be used in a Vendor Score Algorithm (VSA) or computation (also known as a "Dealer Scoring Algorithm" (DSA), the term vendor and dealer will be used interchangeably herein) which can be used to select, filter or present vendors in response to a user-submitted product search. For example, after a user specifies his/her geographic location (e.g., ZIP Code or address) and desired product, the VSA can identify all vendors in the user's local area that sell that particular product. The VSA can then rank the eligible vendors and present those with the highest probability of sale to the user. The VSA algorithm could incorporate, for example, price-distance tradeoff, vendor satisfaction, historical performance, inventory features, and network features to get a probability of closing a sale to customer from a certain geographic area. Such a VSA may be used in a variety of customer contexts, in a variety of channels or with a variety of types of products or services.

While embodiments of systems and methods may be usefully applied to the searching or purchasing of almost any product or service where purchases and searching is accomplished online or offline, embodiment may be especially useful in the context of online searching or purchasing of new cars. More specifically, in certain embodiments, such a VSA may be used to filter online searches for vendors. More particularly in certain embodiments, such a VSA may be used in the context of online car searching to filter online searches for new cars or vendors based on the probability of closing a sale.

For example, TrueCar (www.truecar.com) is an automotive Web site that provides competitive, upfront price quotes. Embodiments of the systems and method disclosed herein may be used by such a Web site in a dealer selection process to filter and present dealers (e.g., 3 selected dealers) that most likely to yield a sale in the TrueCar network in response to a user-submitted upfront pricing search. In certain embodiments, only leads from customers with high probability of buying will be sent to the dealer. In this embodiment, a DSA may incorporate various dealer features such as dealer price, drive distance, drive time from dealer to customer ZIP code, dealer perks, historical performance, dealer location, defending champion and inventory. Some rescaled variables may be further derived from dealer features to reflecting those characteristics compared to other candidate dealers. Customer attributes such as searched vehicle make, customer local area dealer network density and ZIP code level customer historical buying behavior indicator like number of sale in searched ZIP code are included to model the probability of buying for a unique customer to buy from dealers compared to other users. Each dealer's expected revenue can be further calculated by combined information from probability of sale of the DSA model, local demand and dealer's inventory data.

It may be helpful here to give the context of the use of embodiments of systems and methods presented herein. It will be helpful to an understanding of these embodiments to review the methods and systems illustrated U.S. patent application Ser. No. 12/556,137, entitled "SYSTEM AND METHOD FOR SALES GENERATION IN CONJUNCTION WITH A VEHICLE DATA SYSTEM," filed Sep. 9, 2009, which is fully incorporated herein by reference in its entirety. Using the TrueCar Web site each user enters his/her ZIP Code and the desired make/model/options for the vehicle they are interested in pricing. In one embodiment, a DSA may be used to present 3 TrueCar Certified Dealers and will only show non-Certified Dealers for some programs. Examples of the screens viewable by a user are shown in FIGS. 4, 5, 6*a*, and 6*b*, described below.

Turning now to FIG. 1 which depicts a simplified diagrammatic representation of example system 100 comprising entity computing environment or network 130 of an online solution provider. As illustrated in FIG. 1, user 110 may interact (via a client device communicatively connected to one or more servers hosting Web site 140) with Web site 140 to conduct their product research, and perhaps purchase a new or used vehicle through Web site 140. In one embodiment, the user's car buying process may begin when the user directs a browser application running on the user's computer to send a request over a network connection (e.g., via network 120) to Web site 140. The user's request may be processed through control logic 180 coupled to Web site 140 within entity computing environment 130.

An example of the user's computer or client device can include a central processing unit ("CPU"), a read-only memory ("ROM"), a random access memory ("RAM"), a hard drive ("HD") or storage memory, and input/output device(s) ("I/O"). I/O can include a keyboard, monitor, printer, and/or electronic pointing device. Example of an I/O may include mouse, trackball, stylus or the like. Further, examples of a suitable client device can include a desktop computer, a laptop computer, a personal digital assistant, a cellular phone, or nearly any device capable of communicating over a network.

Entity computer environment 130 may be a server having hardware components such as a CPU, ROM, RAM, HD, and I/O. Portions of the methods described herein may be implemented in suitable software code that may reside within ROM, RAM, HD, database 150, model(s) 190 or a combination thereof. In some embodiments, computer instructions implementing an embodiment disclosed herein may be stored on a digital access storage device array, magnetic tape, floppy diskette, optical storage device, or other appropriate computer-readable storage medium or storage device. A computer program product implementing an embodiment disclosed herein may therefore comprise one or more computer-readable storage media storing computer instructions translatable by a CPU to perform an embodiment of a method disclosed herein.

In an illustrative embodiment, the computer instructions may be lines of compiled $C^{++}$, Java, or other language code. Other architectures may be used. For example, the functions of control logic 180 may be distributed and performed by multiple computers in enterprise computing environment 130. Accordingly, each of the computer-readable storage media storing computer instructions implementing an embodiment disclosed herein may reside on or accessible by one or more computers in enterprise computing environment 130. The various software components and subcomponents, including Web site 140, database 150, control logic 180, and model(s) 190, may reside on a single server computer or on any combination of separate server computers. In some embodiments, some or all of the software components may reside on the same server computer.

In some embodiments, control logic 180 may be capable of determining a probability of closing a sale based in part on a portability of a vendor 125*i* selling a product to a customer and the probability of the customer buying the product from a specific vendor 125*i*. In some embodiments, information about dealers and vendors 125*i* known to control logic 180 may be stored on database 150 which is accessible by control logic 180 as shown in FIG. 1.

Control logic 180 can be configured to filter, select, and present a list of vendors 125*i* with a high probability of closing a sale to a customer utilizing model(s) 190. Model(s) 190 may be based in part on the portability of a vendor 125*i* to sell a product to a customer and the portability of a customer buying the product from vendor 125*i* that may utilize information from a plurality of system components, including data from a list of available dealers and their performance history from database 150 and/or dealers, information associated with users stored in database 150, and/or information associated with vendors 125*a-n* stored in database 150.

Figure 2:
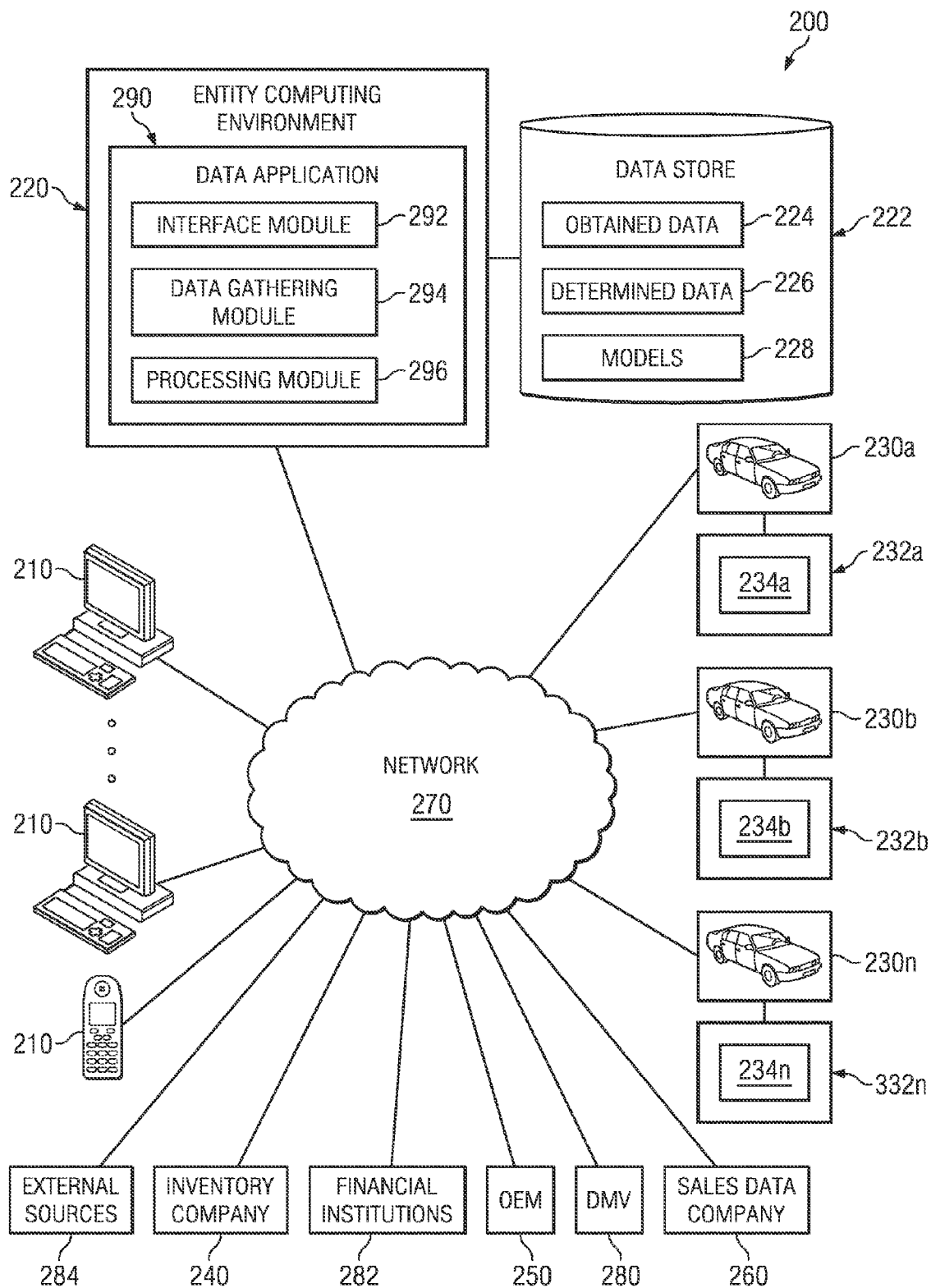
FIG. 2 depicts a simplified diagrammatic representation of one example network architecture in which embodiments disclosed herein may be implemented.

FIG. 2 depicts one embodiment of a topology 200 which may be used to implement embodiments of the systems and methods disclosed herein. Specifically, topology 200 comprises a set of entities including entity computing environment 220 (also referred to herein as the TrueCar system) which is coupled through network 270 to computing devices 210 (e.g., computer systems, personal data assistants, kiosks, dedicated terminals, mobile telephones, smart phones, etc.,), and one or more computing devices at inventory companies 240, original equipment manufacturers (OEM) 250, sales data companies 260, financial institutions 282, external information sources 284, departments of motor vehicles (DMV) 280 and one or more associated point of sale locations, in this embodiment, vendors 230.

Network 270 may comprise, for example, a wireless or wireline communication network such as the Internet or wide area network (WAN), publicly switched telephone network (PTSN), or any other type of electronic or non-electronic communication link such as mail, courier services or the like.

Entity computing environment 220 may comprise one or more computer systems with central processing units executing instructions embodied on one or more computer readable media where the instructions are configured to perform at least some of the functionality associated with embodiments of the present invention. These applications may include a vehicle data application 290 comprising one or more applications (instructions embodied on a computer readable media) configured to implement an interface module 292, data gathering module 294 and processing module 296. Furthermore, entity computing environment 220 may include data store 222 operable to store obtained data 224 such as dealer information, dealer inventory and dealer upfront pricing; data 226 determined during operation, such as a quality score for a dealer; models 228 which may comprise a set of dealer cost model or price ratio models; or any other type of data associated with embodiments or determined during the implementation of those embodiments.

More specifically, in one embodiment, data stored in data store 222 may include a set of dealers with corresponding dealer information such as the name and location of a dealer, makes sold by the dealer, etc. Data in data store 222 may also include an inventory list associated with each of the set of dealers which comprises the vehicle configurations currently in stock at each of the dealers.

Entity computing environment 220 may provide a wide degree of functionality including utilizing one or more interfaces 292 configured to for example, receive and respond to queries or searches from users at computing devices 210;

interface with inventory companies 240, manufacturers 250, sales data companies 260, financial institutions 270, DMVs 280 or dealers 230 to obtain data; or provide data obtained, or determined, by entity computing environment 220 to any of inventory companies 240, manufacturers 250, sales data companies 260, financial institutions 282, DMVs 280, external data sources 284 or vendors 230. It will be understood that the particular interface 292 utilized in a given context may depend on the functionality being implemented by entity computing environment 220, the type of network 270 utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, or almost any other type of interface which it is desired to utilize in a particular context.

In general, through these interfaces 292, entity computing environment 220 may obtain data from a variety of sources, including one or more of inventory companies 240, manufacturers 250, sales data companies 260, financial institutions 282, DMVs 280, external data sources 284 or vendors 230 and store such data in data store 222. This data may be then grouped, analyzed or otherwise processed by entity computing environment 220 to determine desired data 226 or model(s) 228 which are also stored in data store 222.

A user at computing device 210 may access the entity computing environment 220 through the provided interfaces 292 and specify certain parameters, such as a desired vehicle configuration. Entity computing environment 220 can select or generate data using the processing module 296. A list of vendors 230 can be generated from the selected data set, the data determined from the processing and presented to the user at the user's computing device 210. More specifically, in one embodiment interfaces 292 may visually present this data to the user in a highly intuitive and useful manner.

In particular, in one embodiment, a visual interface may present at least a portion of the selected data set as a price curve, bar chart, histogram, etc. that reflects quantifiable prices or price ranges (e.g., "average," "good," "great," "overpriced," etc.) relative to reference pricing data points (e.g., invoice price, MSRP, dealer cost, market average, internet average, etc.). The visual interface may also include a list of vendors 230 with the highest probability of closing a sale based in part on a probability of sale from a customer's perspective and a probability of buying from a vendor's perspective.

Turning to the various other entities in topology 200, vendor 230 may be a retail outlet for vehicles manufactured by one or more of OEMs 250. To track or otherwise manage sales, finance, parts, service, inventory and back office administration needs vendor 130 may employ a dealer management system (DMS) 232. Since many DMS 232 are Active Server Pages (ASP) based, transaction data 234 may be obtained directly from the DMS 232 with a "key" (for example, an ID and Password with set permissions within the DMS system 232) that enables data to be retrieved from the DMS system 232. Many vendors 230 may also have one or more Web sites which may be accessed over network 270.

Additionally, a vendor's current inventory may be obtained from a DMS 232 and associated with that dealer's information in data store 222. A vendor 230 may also provide one or more upfront prices to operators of entity computing environment 220 (either over network 170, in some other electronic format or in some non-electronic format). Each of these upfront prices may be associated with a vehicle configuration such that a list of vehicle configurations and associated upfront prices may be associated with a vendor 230i in data store 222.

Inventory companies 240 may be one or more inventory polling companies, inventory management companies or listing aggregators which may obtain and store inventory data from one or more of vendors 130 (for example, obtaining such data from DMS 232). Inventory polling companies are typically commissioned by the vendor to pull data from a DMS 232 and format the data for use on Web sites and by other systems. Inventory management companies manually upload inventory information (photos, description, specifications) on behalf of the vendor. Listing aggregators get their data by "scraping" or "spidering" Web sites that display inventory content and receiving direct feeds from listing Web sites (for example, Autotrader, FordVehicles.com).

DMVs 280 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes.

Financial institution 282 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 260 may include any entities that collect any type of vehicle sales data. For example, syndicated sales data companies' aggregate new and used sales transaction data from the DMS 232 systems of particular vendors 230. These companies may have formal agreements with vendors 130 that enable them to retrieve data from the dealer 230 in order to syndicate the collected data for the purposes of internal analysis or external purchase of the data by other data companies, dealers, and OEMs.

Manufacturers 250 are those entities which actually build the products sold by vendors 230. In order to guide the pricing of their products, such as vehicles, the manufacturers 250 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 284 may comprise any number of other various source, online or otherwise, which may provide other types of desired data, for example data regarding vehicles, pricing, demographics, economic conditions, markets, locale(s), consumers, etc.

It should be noted here that not all of the various entities depicted in topology 200 are necessary, or even desired, in embodiments of the present invention, and that certain of the functionality described with respect to the entities depicted in topology 100 may be combined into a single entity or eliminated altogether. Additionally, in some embodiments other data sources not shown in topology 200 may be utilized. Topology 200 is therefore exemplary only and should in no way be taken as imposing any limitations on embodiments of the present invention.

Before delving into details of various embodiments, it may be helpful to give a general overview with respect to the above described embodiment of a topology, again using the example commodity of vehicles. At certain intervals then, entity computing environment 220 may obtain by gathering data from one or more of inventory companies 240, manufacturers 250, sales data companies 260, financial institutions 282, DMVs 280, external data sources 284 or vendors 230. This data may include sales or other historical transaction data for a variety of vehicle configurations, inventory data, registration data, finance data, vehicle data, upfront prices from dealers, etc. (the various types of data obtained will be discussed in more detail later). This data may be processed to yield data sets corresponding to particular vehicle configurations.

At some point then, a user at a computing device 210 may access entity computing environment 220 using one or more interface 292 such as a set of web pages provided by entity computing environment 220. Using this interface 292 a user may specify a vehicle configuration by defining values for a certain set of vehicle attributes (make, model, trim, power train, options, etc.) or other relevant information such as a geographical location. Information associated with the specified vehicle configuration may then be presented to the user through interface 292. This information may include pricing data corresponding to the specified vehicle and upfront pricing information and/or a list of vendors 230i with the highest probability of closing.

In particular, the list of vendors 230i with the highest probability of closing a sale may be determined and presented to the user on computing device 210 in a visual manner. In further example embodiments, a list of vendors 230i with the likelihood of producing the highest revenue to a parent organization associated with entity computing environment 220 may be presented to the user. The revenue to the parent organization may be based in part in the probability of closing a sale along with a revenue factor.

Figure 3:
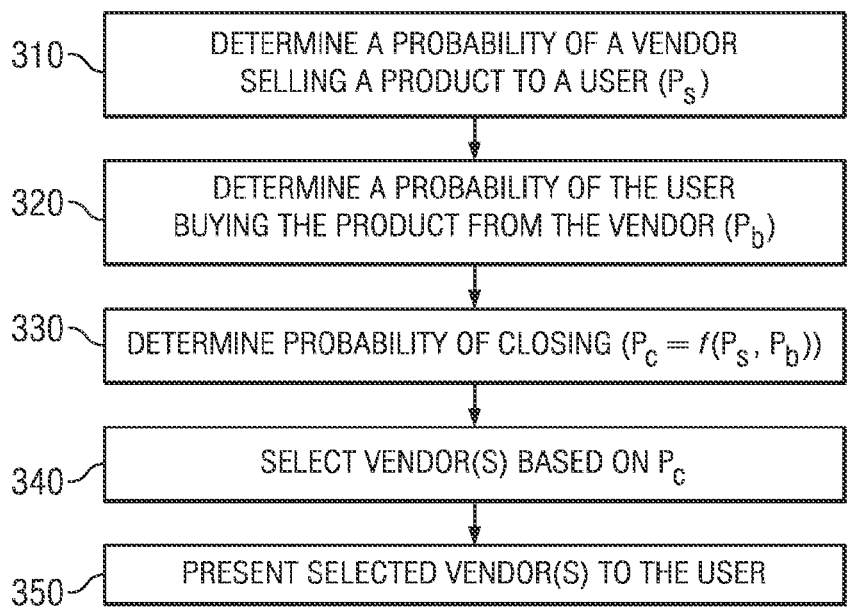
FIG. 3 depicts a diagrammatic representation of a flow diagram for presenting sales outlets.

Turning now to FIG. 3, one embodiment of a method for determining vendors to be presented to a user is depicted. At step 310, a probability of a specific vendor selling a product ($P_s$) to a user interested in purchasing the product given that the vendor is presented in a set of vendors may be determined. In one embodiment, for example, a probability of the specific vendor selling a product ($P_s$) to the user may include two components. A first component may reflect various features of the specific vendor, and a second component may reflect the same features as the first component but expressed relative to other vendors within a set of vendors.

At step 320, a probability of the user buying the product from the vendor ($P_b$) given a historical preference of the user may be determined. In one embodiment, for example, the probability of the user buying the product from the vendor ($P_b$) may include two components. A first component may reflect various demographic features of an individual customer, while a second component may reflect interactions of the individual customer and a particular vendor.

At step 330, a probability of closing a sale ($P_c$) for each vendor within the set may be determined, where ($P_c$) is a function of ($P_s$) and ($P_b$). As discussed above, this bilateral decision process can be expressed as:

$$P_c = f(P_s, P_b)$$

At step 340, one or more vendors from the set of vendors is selected based on the ($P_c$) associated with each vendor. The probability of closing a sale ($P_c$) may be used by the customer and the vendors to better match a customer's needs with vendors with whom a successful sale has a higher probability of occurring. In further example embodiments, the one or more vendors from the set of vendors may be selected based on an expected revenue factor of each vendor.

At step 350, the one or more selected vendors may be presented to the user interested in purchasing the product via a user interface on a user device associated with the user. By presenting the one or more selected vendors to the user, only a subset of the original set may be presented to the user. Thus, by displaying only the vendors with the highest likelihood to complete, a benefit to both users and vendors may simplify a customer's search time while increasing vendor's profits.

Figure 4:
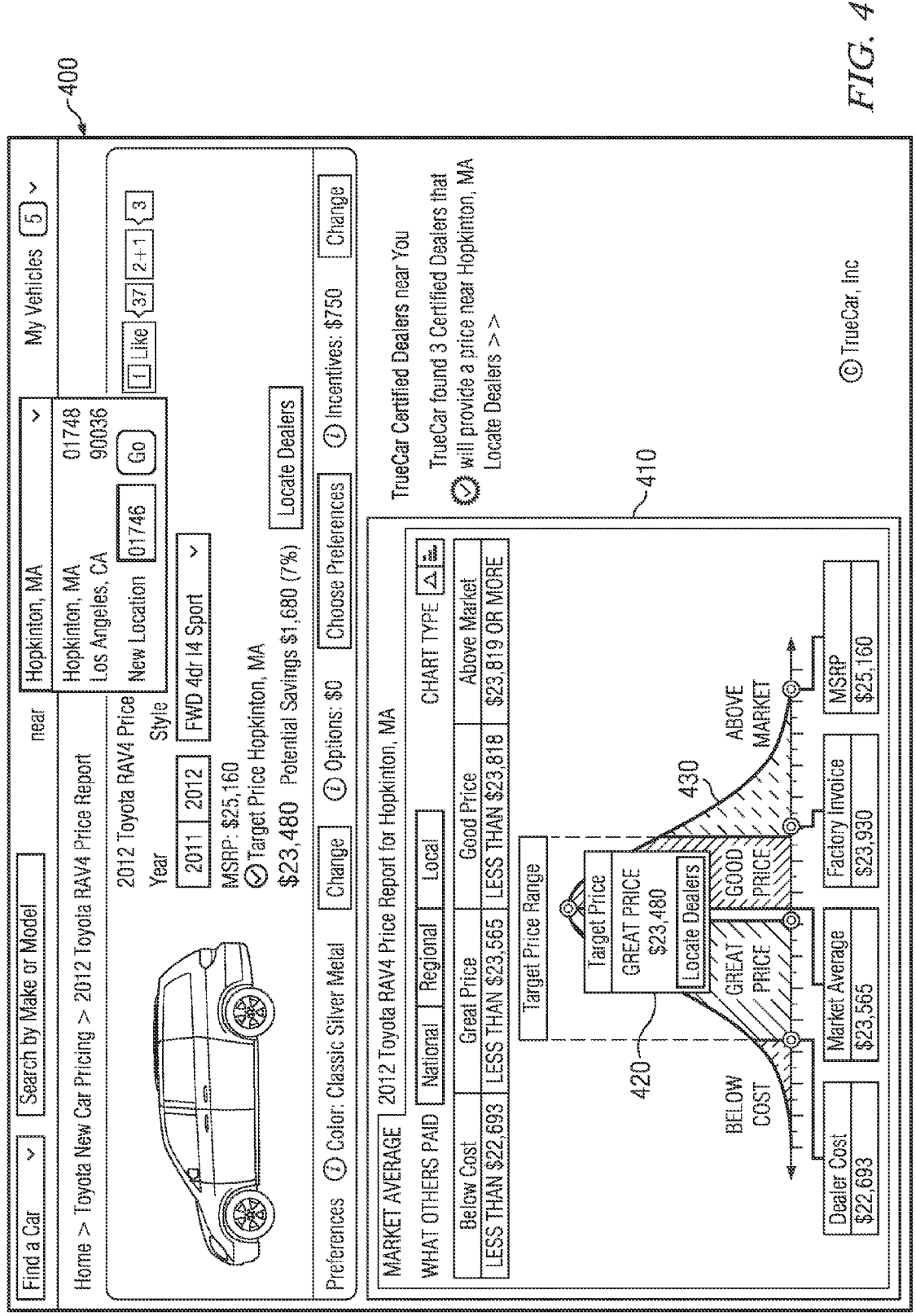

FIG. 4 depicts one embodiment of an interface 400 provided by the TrueCar system for the presentation of upfront pricing information 420 for a specified vehicle configuration to a user in conjunction with the presentation of pricing data for that vehicle configuration. Within interface 400 a user may be able to enter information related to a specific make and/or model for a vehicle. Within interface 400 the user may also enter geographic information such as a zip code associated with the user. In return, the TrueCar system may generate price report 410 and present same to the user via interface 400.

Price report 410 may comprise Gaussian curve 430 which illustrates a normalized distribution of pricing (for example, a normalized distribution of transaction prices). On the curve's X-axis, the average price paid may be displayed along with the determined dealer cost, invoice or sticker price to show these prices relevancy, and relation, to transaction prices. The determined "good," "great," "overpriced," etc. price ranges are also visually displayed under the displayed curve to enable the user to identify these ranges.

In addition, pricing information 420 may be displayed as a visual indicator on the x-axis such that a user may see where this pricing information 420 falls in relation to the other presented prices or price ranges within the geographic region.

Figure 5:
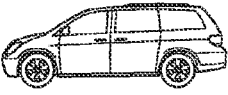

FIG. 5 depicts an embodiment of an interface 500 for the presentation of dealer information associated with pricing information. Interface 500 may be representative of the top three dealers 520, 530, 540 for a specific make and model of a vehicle 510 (2010 Ford Explorer RWD 4DR XLT near ZIP code 02748) after a "locate dealer" button is clicked. For each dealer interface 500 may comprise dealer information, pricing data, vehicle configuration data, and instructions for obtaining an offered upfront price from the dealer for a specific make and model of a vehicle 510.

Based in part of the make and model of the vehicle 510, interface 500 may present a user who is interested in purchasing vehicle 510 with one or more vendors 510, 520, 530. The one or more vendors 510, 520, 530 may be determined and/or selected based in part on a probability of closing a sale associated with each vendor within a set of vendors.

Interface 500 may also include forms 550 where a user may enter personal information such as a name, address, and contact information of the user. The personal information of the user may be used to more accurately or efficiently determine the probability of a vendor closing a sale.

Figure 6B:

Referring to FIGS. 6A and 6B, upon entering personal information, the identities of the rated (using, at least in part, an embodiment of a DSA) dealers 610, 620, 630 are displayed or presented to the potential customer via interface 600 along with the price guarantee and any dealer perks (note in FIG. 6B that Colonial Ford has two perks listed: free local delivery and express checkout).

Some embodiments of a DSA are illustrated in patent application Ser. No. 12/655,462, filed Dec. 30, 2009, entitled "SYSTEM, METHOD AND COMPUTER PROGRAM PRODUCT FOR PREDICTING VALUE OF LEAD," which is fully incorporated herein by reference in its entirety. It will be useful here to go into more details about how one such embodiment of a DSA for use in such a context may be implemented.

a. Data Description

1) DSA Data

Based on, for example, data collected from September 2010 to April 2011, there are total of 82,994 non-mismatch sale and 18,296 mismatch sales. A mismatch sale is a sale from customer that did submit lead(s) but did not submit a lead to the sale dealer, either by choice or because the DSA did not choose to present that dealer. In one embodiment, mismatches are identified by comparing the dealer identification codes that were listed in the top 3 with the dealer identification code of the seller. If the selling dealer is not in the top 3, then a mismatch has occurred.

Since the historical dealer close rate and other dealer performance variables are calculated using 45 days moving window. Only sales that happen after than Oct. 15, 2010 are included in the final model sample. 634,185 observations and 81,016 sales are used in the final model. Due to the lack of price offset information of mismatch sale dealer, we only include 4,263 mismatches (5.3%) out of 81,016 sales that price offsets are available in the final model. Non-mismatch is defined as those sale cases that happened to one of the three recommended dealers based on a DSA. Mismatch cases are defined as cases that happened to other dealers that were not recommended by a DSA in the top 3 places or those cases that sale dealer was displayed but no lead was generated.

A cohort can be a vendor list in response to a single user query. An example of a cohort is a list of DSA candidate dealers who are available to sell the vehicle requested in a distinct user query. In one embodiment, three dealers within a cohort are selected for display to a user. In one embodiment, cohorts with leads less than 15 days old may also be excluded since the leads take time to convert into sales and those leads may be excluded to prevent underestimate the close rate of dealers.

2) Drive Distance Data

Drive distance and drive time of search ZIP to dealer location are obtained from mapquest.com.

In case of missing values; the drive distance and drive time value are imputed based on the average drive distance and great circle distance ratio for similar an nearby ZIP codes.

3) Dealer Inventory Data

Dealers' new car inventory information can obtained from data feeds provided by dealers.

b. Features

In one embodiment, at least four types of features may be considered in the calculation of probability of closing in this algorithm.

1) Features Describing the Individual Vendor ($X_{i,t}$)

Each vendor has certain special characteristic that may cause the user to prefer one over others. Those specific factors including vendor's price, available inventory, services and perks, historical performance, etc.

Price always plays a big role on sale in a competitive market. The price offset differ from the invoice price of the vehicle is considered as an important factor in the DSA model. In order to reduce the big price variance of different vehicles, the price offset as a percentage of invoice prices is used as the main price variable in the model. For those dealers that do not provide an upfront price or with excluding price, a program max value is used for their price offset. A program max value may be the upper bound for price offset set by a particular program. Once the upfront price for a dealer is larger than the program max, the program max may be displayed to the user instead dealer's price. Furthermore, some dealers do not provide the price offset for certain trims; those cases are considered as excluding price. The program max is used for display when the dealer has excluding price.

In one embodiment, the DSA model incorporates dealers' overall new car inventory as a factor in the model because customers have indicated that vehicle unavailability is a big cause of mismatch sale or failing to close a sale. Customers may complain if they are not able to get the exact cars they want on the price certification when they go to the dealers. Therefore, the new car inventory value is introduced as a variable to measure the overall dealership size. It is reasonable to assume that a large dealership will have a higher probability to have the searched vehicle than a small dealership. So far, there is less than 100% new car inventory data available for all dealers, dealers who do not provide inventory information are assigned average value of inventory in the candidates dealer list for each cohort.

Besides the vehicle itself, car buyers also consider the warranty, maintenance and other services during their decision making. A Web site using embodiments of a DSA may display dealer's special services along with their upfront price and location in the search result. Therefore, whether the dealer provides special services is also considered as a potential factor that might influence the probability of closing a sale. A "perks" dummy variable is defined as "1" if the dealer provides any one of the following service such as limited warranty, money back guarantee, free scheduled maintenance, quality inspection, delivery, free car wash, and "0" otherwise.

Probability of sale is also highly related to the historical performance of a dealer. Dealers with excellent sale persons and a good reputation should have higher close rates than others. Those factors are measures by their historical close rates. In one embodiment, a DSA model calculates the close rate for each dealer based on their performance in previous 45 days. 45 days may be chosen as the moving window because it is a medium length time window that will provide a dealer's historical performance but also can quickly reflect the changes of the overall vehicle market due to factors such as gas price change or new model release. See equation 1 below for details of calculation of dealer close rate. Since some dealers only take leads from those zips that locate 60 miles or closer. The close rate is only based on the sales and leads within 60 miles drive distance. When close rate is missing due to no sale or no leads in the past 45 days, designated market area (DMA) average or any other geographic boundary average close rate is used.

$$\text{Dealer close rate} = \frac{(\text{Count of sales in last 45 days})}{\left(\begin{array}{c}\text{Count of sales in last 15 days} + \\ \text{Count of leads in last 30 days}\end{array}\right)} \quad \text{EQ. (1)}$$

In order to better predict the inventory status of a dealership and put more weight on dealer's most recent performance, one more variable "defending champion" may be added to the model as another type of performance measured variable. The defending champion assigns a higher weight on a recent sale than a sale that is far away. For instance, dealers will get more credits if they made a success sale yesterday than a sale that is 30 days ago. It is assumed that the dealers have recently made a sale for a make will have a higher chance to have similar cars in their inventory than dealers who have not made a sale for a certain time period.

The vehicle make is another dealer feature that might affect the probability of closing a sale. Different makes might have different probability function. In one embodiment of the DSA algorithm, for example, Mercedes-Benz dealers show a different pattern compared to other makes and the close rate for Mercedes-Benz dealers is relatively high compared to network dealers that sold other makes.

2) Features of Individual Vendor Compared to Other Vendors ($X_{i,t,s}$)

The absolute value of individual vendor's attributes may not reflect its advantage or competitiveness. Those features may be ascertained through a comparison to other vendors. Therefore, vendor features relative to other competitors are important factors in predicting the probability of sale in our algorithm.

In one embodiment of the DSA algorithm, most of the individual dealer features such as drive time, price offset; historical close rate, inventory and defending champion are all rescaled among all the candidate dealers within each cohort. Individual dealer's historical dealer close rate, new car inventory are rescaled using the following equation $$x_i = \frac{(x_i - \min_i x)}{(\max_i x - \min_i x)}$$

Drive time, defending champion, price are rescaled using a different equation:

$$x_i = 1 - \frac{(x_i - \min_i x)}{(\max_i x - \min_i x)}$$

All the rescaled variables can range from 0 to 1. Different equation may be used when rescaling the variables because it may be desired to get value 1 to the best dealers for all the dealer features. For example, the dealer with highest historical close rate can get a rescaled close rate 1 and the dealer with lowest close rate can get a value of 0. Similarly, the dealer with the minimum drive time can get a value of 1 and the dealer with maximum drive time can get a value of 0.

Dummy variables indicate best price, closest dealers are included as well to compare the dealer's price and distance relative to others. Additional variable(s) to measure the absolute difference of price and drive time may be constructed to adjust their effects on sale for those cases that the maximum and minimum values do not significantly differ.

Network dealer density is another factor related to dealer i (a type of vendor) itself and other dealer close to dealer j. Each dealer needs to compete with others in a high dealer density area and will be dominant in a low dealer density area. In one embodiment, this make and dealer density interaction may only be accounted for at the same make level. However, it is possible that the dealer with similar makes (e.g., Nissan and Honda) will be competitors as well.

3) Features Describing Individual Customer ($Y_{c,t}$)

The demographic features of individual customer may result in different interests on products and buying the same products from different vendors. Those factors can include income, family size, net worth, gender, historical purchase behavior, etc. Those user data can be obtained from public data source such as U.S. census data or online user database for different industries.

In one embodiment of a DSA algorithm, searched vehicle make and customer local dealer density are included in predicting the probability of buying ($P_b$) for a particular cohort. Customers' choice of vehicle make is a potential indicator of customer's income, family size. It is highly possible that people purchasing luxury cars are less sensitive to price and more sensitive to drive time. In this case, the DSA algorithm can put more weight on distance when the customer comes from a high income ZIP code to increase the probability of closing ($P_c$). It may also be assumed that price is more important on sale for customer located in a large city with high dealer density while distance is more important for people in rural area with only 2 dealerships available within 200 miles. Count of available dealers within certain drive time radius is used as customer local dealer density variable. Dummy variable for each make are included in the model selection process using statistical software (SAS Proc logistic, for example), three out of 35 makes (Mercedes-Benz, Mazda, Volkswagen) result in significant p-values for their dummy variables, which indicates that those three makes have different sales probability compared to other makes. Further, make and dealer density interaction terms are tested as well and the interaction between Mercedes-Benz and dealer density remain significant. So those factors may also be included in embodiment of a DSA model. Although the make and network features may not affect the dealer ranks within each cohort since each cohort will have the same make and density information for different candidate dealers, those factors will affect the expected revenue (for example, for each dealer or of an entity getting paid by dealers for leads such as TrueCar) that those three makes have different function of probability of sale compared to other makes.

Besides the demographic features, customer's historical buying preferences may also influence one's purchasing behavior. Those types of factors are frequency and volume of transactions, the price level category (low, medium, high) in which their transactions fall, previous purchase history, etc. It is possible a customer brought a 2-door Mini Cooper before might want to buy a 4 door car that might be used in different circumstance. Therefore, previous purchase choice of make, vehicle body type will be indicators of next purchase as well.

4) Features Describing the Interactions of a Particular Customer and a Particular Vendor ($Y_{c,t}$)

In terms of car purchase, distance is one of the most important interaction terms between customer and dealers which influence buyers' decision. This is also true for other large products similar as vehicles. In one embodiment, great circle distance of a dealer may be considered. However, there are certain areas with islands and lakes (such as: Great Lakes or Long Beach, N.Y.) that drive distance would be a better indicator of distance compared to great circle distance. Drive time may also be used in embodiments of a DSA model because the same drive distance in different locations might relate to different drive time. For example, 60 miles in a rural area might be related to a 1 hour drive but 2 hours or even more in a big city. Therefore, drive time would be a variable that can be equalized to people in different locations.

Five drive distance derived dummy variables which indicate if the dealer is located in a certain distance range are developed in order to capture the sale and distance relationship for certain special cases. It is possible that the drive time for the closest dealer and furthest dealer do not differ too much. In those cases, those variables will adjust the weights on minimum drive time so that we do not overestimate the effect of minimum drive time on sale.

In addition, dealer location is also important to sale when the customer is located in the border of two states. Due to the different rules on vehicle regulation and registration, people might tend to go to a dealer locates in the same state as where they live. "Same State" dummy variable is therefore include in our model to indicate if the customer and dealer are located in the same state.

In certain cases, certain dealers have outstanding performance in certain ZIP code areas compared to their average performance across all the ZIP codes. This might be due to some customer population characteristics in certain ZIP code. For example, a ZIP code with high density of immigrants whose first language is not English might go to a dealership with sale persons that can speak their first language or have a dealer Web site with their first language. Therefore, a variable measure dealer's performance in specific ZIP code is also included in embodiment of the DSA model. It is defined as the number of sale in a specific customer search ZIP in the past 45 days.

In addition, it is also possible that customer might go to the same dealer if they bought a car from this dealer before. The customer loyalty effect might be even more pronounced in some other industries which provide services rather than actually products. This can be one of the most important factors for predict the probability of buying for a particular customer from a certain vendor.

Operationally, embodiments of a DSA would use the estimated model by feeding in the values of the independent variables into the model, computing the probabilities for each candidate dealer in a set s, and present the dealers with the top probabilities of closing to customer c.

Below is a non-exclusive list of variables that could be utilized in a DSA model:
Proximity
Dealer Close Rate
Price
Selection
Dealer Perks/Benefits
Customer Household Attributes
Additional Customer Attributes
   Credit Score
   Garage Data (current owner of same brand of vehicle, etc.)
Additional Dealer Attributes
   Profile Completeness
   Dealer Rating
   Customer Satisfaction Rating
   Dealer Payment History
Transaction Attributes
   Transaction type (e.g., Lease, Cash, Finance)
   Trade-In (i.e., whether a trade-in vehicle is involved)

As an example, a DSA may consider all dealers, (i=1, ... K) selling the same trim (t=1, ..., T) to users in ZIP Code z (z=1, ..., $Z_L$) located in the same locality L (z∈L if the drive time distance from the customer's search ZIP code center to dealer location≤3 hours). The model uses a logistic regression based on the combined data of inventory, DSA historical data, drive distance, and dealer perks.

$$P_c = f(P_s, P_b) = \frac{1}{1 + e^{-(\theta_{i,t,s} + \delta_{c,t,i})}}$$

where
$\theta_{i,t,s} = \beta_o$
{Features of individual dealers, i}
$+\beta_1 \times$dealer's price within each cohort
$+\beta_2 \times$dealer's inventory within each cohort
$+\beta_3 \times$dealer's perks
$+\beta_4 \times$dealer's historical close rate
$+\beta_5 \times$dealer's defending champion
$+\beta_6 \times$the make of trim t sold by dealer i is Mercedes-Benz
$+\beta_7 \times$the likelihood of payment by dealer i to a parent company
$+\beta_8 \times$if dealer i has completed a profile
$+\beta_9 \times$dealer i's rating
$+\beta_{10} \times$dealer i's customer satisfaction
{Features relative to other candidate dealers, i,S}
$+\beta_{11} \times$Mercedes-Benz make and density interaction
$+\beta_{12} \times$Mazda make and density interaction
$+\beta_{13} \times$Volkswagen make and density interaction
$+\beta_{14} \times$if dealer has the minimum drive time
$+\beta_{15} \times$if dealer has lowest price within each cohort
$+\beta_{16} \times$difference between the dealer's price and maximum price offset in percentage of invoice
$+\beta_{17} \times$difference between the dealer's drive time and minimum drive time dealer
$\delta_{c,t,i} = \alpha_o$
{Features of individual Customer, c}
$+\alpha_1 \times$the household income of customer c
$+\alpha_2 \times$the family size of customer c
$+\alpha_3 \times$customer c's household size
$+\alpha_4 \times$count of dealers within 30 min drive
$+\alpha_5 \times$count of dealers within 1 hour drive
$+\alpha_6 \times$count of dealers within 2 hours drive
$+\alpha_7 \times$if customer c bought this type, or this make before
$+\alpha_8 \times$customer c's credit score
$+\alpha_9 \times$customer c's garage data (if customer c is a current owner of same brand of vehicle, etc.)
$+\alpha_{10} \times$transaction type (lease, cash, finance, etc.)
$+\alpha_{11} \times$is a trade in associated with the potential purchase
{Features describing the interaction of customer c and dealer i}
$+\alpha_{12} \times$drive time from customer c to dealer i
$+\alpha_{13} \times$if customer c bought from dealer i before
$+\alpha_{14} \times$dealer i's number of sales in customer c's ZIP code
$+\alpha_{15} \times$if dealer i is within 10 miles of customer c
$+\alpha_{16} \times$if dealer i is within 10-30 miles of customer c
$+\alpha_{17} \times$if dealer i is within 30-60 miles of customer c
$+\alpha_{18} \times$if dealer i is within 60-100 miles of customer c
$+\alpha_{19} \times$if dealer i is within 100-250 miles of customer c
$+\alpha_{20} \times$if dealer i is in the same state as customer c
$+\epsilon_{c,t,i}$ Although each of the above factors may be vital for determining the probability of closing a sale ($P_c$), embodiments do not require each factor to be present in a DSA. For example, in an embodiment the DSA may include the following features of an individual dealer a dealer's price within each cohort ($\beta_1$), dealer's inventory within each cohort ($\beta_2$), dealer's historical close rate ($\beta_4$) and drive time from customer c to dealer i ($\alpha_{12}$) which is a feature describing an interaction of customer c and dealer i.

Although the dealer rank may not change if customer features and customer historical preference variables are excluded from the DSA, it may still be decided to include them in embodiments of the DSA model because the overall probability of closing will be different for different makes. This probability may be applied to calculate the each dealer's expected revenue and that number will be affect by the choice of make and customer local dealer density.

A non-limiting example for determining $P_e$ and selecting a set of dealers i for presentation to an interested consumer c will now be described with these example parameters: search zip="01748" Hopkinton, Mass., Make="Toyota", Trim_id="252006", Trim="2012 Toyota RAV4 FWD 4dr I4 sport".

TABLE 1

| Parameter | Label | Estimate | Std | Pr > ChiSq | Odds Ratio |
|---|---|---|---|---|---|
| Intercept | | −6.838 | 0.058 | <.0001 | |
| Distance | | | | | |
| DD10 | If dealer is within 10 miles | 2.934 | 0.035 | <.0001 | 18.802 |
| DD30 | If dealer is within 10-30 miles | 2.366 | 0.031 | <.0001 | 10.657 |
| DD60 | If dealer is within 30-60 miles | 1.572 | 0.029 | <.0001 | 4.817 |
| DD100 | If dealer is within 60-100 miles | 0.937 | 0.028 | <.0001 | 2.552 |
| DD150 | If dealer is within 100-150 miles | 0.347 | 0.029 | <.0001 | 1.414 |
| DD250 | if dealer is with 150-250 miles | | | Reference | |
| min_DT_I | If dealer has min drive time | 1.029 | 0.014 | <.0001 | 2.798 |
| r_DT | Rescaled drive time | 3.642 | 0.065 | <.0001 | 38.148 |
| DT_diff | Difference between the Max drive time | −0.13 | 0.005 | <.0001 | 0.878 |
| Price | | | | | |
| min_price_I | If dealer has lowest price | 0.31 | 0.015 | <.0001 | 1.363 |
| pct_offset_diff | Difference between the max percent price offset of invoice | 7.819 | 0.258 | <.0001 | >999.999 |
| r_price | Rescaled Price | 2.247 | 0.063 | <.0001 | 9.456 |
| DT Price | Price, drive time interaction | −1.556 | 0.066 | <.0001 | 0.211 |
| Dealer Attributes | | | | | |
| r_inventry | Rescaled new car inventory | 0.176 | 0.017 | <.0001 | 1.192 |
| perks | If dealer provide special service | 0.065 | 0.011 | <.0001 | 1.068 |
| r_defending_champ | Rescaled Defending Champing | 0.508 | 0.016 | <.0001 | 1.662 |
| r_zip_sale | Rescaled number of sale in requested zip code | 0.287 | 0.014 | <.0001 | 1.333 |
| r_CR | Rescaled historical close rate | 0.196 | 0.016 | <.0001 | 1.217 |
| same_state | If dealer is in the same sate | 0.318 | 0.014 | <.0001 | 1.374 |
| make_id27 | Mercedes-Benz | 1.794 | 0.189 | <.0001 | 6.014 |
| make_id27_d | Mercedes, Dealer Density interaction | −0.755 | 0.082 | <.0001 | 0.47 |
| make_id26_d | Mazda, Dealer Density interaction | −0.033 | 0.01 | 0.0007 | 0.967 |
| make_id40_d | Volkswagen, Dealer Density interaction | 0.015 | 0.005 | 0.0039 | 1.015 |
| Network Attributes | | | | | |
| dealer_cnt_30 | Count of Zag dealers within 30 min drive | −0.132 | 0.005 | <.0001 | 0.877 |
| dealer_cnt_60 | Count of Zag dealers within 1 hour drive | −0.096 | 0.004 | <.0001 | 0.908 |
| dealer_cnt_120 | Count of Zag dealers within 2 hous drive | −0.12 | 0.003 | <.0001 | 0.887 |

As Table 1 exemplifies, weightings or coefficients can be associated with features utilized in a DSA model. For example, if a dealer i is closer to the consumer c (e.g., driving distance or DD is small), then that dealer i will have a higher coefficient than another dealer that is further from the consumer c. More so, features with a "_i" may be bimodal attributes where the attribute is either added to the DSA or not. Rescaled features may be the rescaled variables as previously described. Std represents the standard deviation of a coefficient, Pr>ChiSq may represent if an attribute is important, and the odds ratio represents a relative significance of an attribute. Network attributes may represent the competition or number of other networked dealers within a geographical region. Using the above coefficients for attributes, a DSA model may determine $P_s$, $P_b$.

Table 2 below shows by example attributes for a set of dealers i (dealership_id) that are the closest to the consumer c and that sell a particular vehicle trim that the consumer c is interested in buying. In this non-limiting example, "gcd", "drive_time", and "drive_distance" may be raw data/attributes associated with a distance variable from a dealer i to the consumer c. For example, "gcd" may represent an aerial distance ("as the crow flies") from a dealer i to the consumer c, "drive_time" may represent the driving time distance in seconds from a dealer i to the consumer c, and "drive_distance" may represent the driving distance from a dealer i to the consumer c. "DD10", "r_DT", "Dt_diff" may represent computed attributes of variables for each dealer i within the set S. For example, "DD10" may represent a bimodal variable given if a dealer is within 10 miles of the consumer c, "r_DT" may represent a rescaled drive time relative to the other dealers in the set, and "Dt_diff" may represent a rescaled value between the maximum drive time distance of a dealer i within the set S and the consumer c.

TABLE 2

Distance Variable

| dealership_id | gcd | drive_time | drive_distance | DD10 | DD30 | DD60 | DD100 | DD150 | min_DT_I | r_DT | DT_diff |
|---|---|---|---|---|---|---|---|---|---|---|---|
| 3730 | 6.11 | 621 | 10.74 | 0 | 1 | 0 | 0 | 0 | 1 | 1.00 | 0.53 |
| 6895 | 20.69 | 1560 | 28.40 | 0 | 1 | 0 | 0 | 0 | 0 | 0.51 | 0.27 |
| 7708 | 35.45 | 2193 | 49.37 | 0 | 0 | 1 | 0 | 0 | 0 | 0.18 | 0.10 |
| 8086 | 48.16 | 2537 | 64.17 | 0 | 0 | 0 | 1 | 0 | 0 | 0.00 | 0.00 |
| 8502 | 21.37 | 2054 | 34.36 | 0 | 0 | 1 | 0 | 0 | 0 | 0.25 | 0.13 |
| 9054 | 22.67 | 1315 | 28.79 | 0 | 1 | 0 | 0 | 0 | 0 | 0.64 | 0.34 |
| 9756 | 26.99 | 1925 | 44.44 | 0 | 0 | 1 | 0 | 0 | 0 | 0.32 | 0.17 |

Table 3 below represents attributes of the closet dealers i to consumer c. "Price_offset" represents a difference between a price a dealer i is selling a vehicle and an "invoice" price. Further, "Min_price_i" and "pct_offset_diff" represent computed attributes of variables for each dealer within the set. More specifically, "Min_price_i" is an attribute reflecting which dealer i within the set S has the lowest price, and "pct_offset_diff" represents a price percentage difference between the price the dealer i is selling the vehicle and the maximum price a dealer i within the set S is selling the vehicle.

TABLE 3

Price Variable

| dealership_id | price_offset | invoice | min_price_I | pct_offset_diff | r_price | DT_Price |
|---|---|---|---|---|---|---|
| 3730 | $99 | $23,578 | 0 | 0.05 | 0.60 | 0.60 |
| 6895 | $1,200 | $23,578 | 0 | 0.00 | 0.00 | 0.00 |
| 7708 | −$400 | $23,578 | 0 | 0.07 | 0.87 | 0.16 |
| 8086 | −$649 | $23,578 | 1 | 0.08 | 1.00 | 0.00 |
| 8502 | $350 | $23,578 | 0 | 0.04 | 0.46 | 0.12 |
| 9054 | −$200 | $23,578 | 0 | 0.06 | 0.76 | 0.48 |
| 9756 | −$550 | $23,578 | 0 | 0.07 | 0.95 | 0.30 |

Table 4 below represent attributes associated with the particulars dealers in Table 3. Notice in this case, dealer "9054" is indicated as the "defending champion" in the set. Dealer "7708" is indicated as having a close rate of 1.00 and not in the same state with the consumer c.

TABLE 4

Dealer Attributes

| Dealership_id | inventory | r_inv | perks | r_defending_champ | sale_inzip_last_45 days | r_zip_sale | close_rate |
|---|---|---|---|---|---|---|---|
| 3730 |  | 0.5 | 0 | 0.72 | 0 | 1 | 0.08 |
| 6895 |  | 0.5 | 1 | 0.25 | 0 | 1 | 0.23 |
| 7708 |  | 0.5 | 0 | 0.23 | 0 | 1 | 1.00 |
| 8086 |  | 0.5 | 1 | 0.39 | 0 | 1 | 0.10 |
| 8502 | 92 | 0 | 1 | 0.12 | 0 | 1 | 0.06 |
| 9054 | 309 | 1 | 0 | 1.00 | 0 | 1 | 0.15 |
| 9756 |  | 0.5 | 0 | 0.82 | 0 | 1 | 0.09 |

| Dealership_id | r_CR | same_state | make_id27 | make_id27_d | make_id26_d | make_id4_d |
|---|---|---|---|---|---|---|
| 3730 | 0.00 | 1 | 0 | 0 | 0 | 0 |
| 6895 | 1.00 | 1 | 0 | 0 | 0 | 0 |
| 7708 | 0.20 | 0 | 0 | 0 | 0 | 0 |
| 8086 | 0.16 | 1 | 0 | 0 | 0 | 0 |
| 8502 | 0.20 | 1 | 0 | 0 | 0 | 0 |
| 9054 | 0.48 | 1 | 0 | 0 | 0 | 0 |
| 9756 | 0.07 | 1 | 0 | 0 | 0 | 0 |

Table 5 below represents an example of DSA ranking based on $P_c$ which may be expressed as $$\frac{e^z}{e^z+1} = \frac{1}{1+e^{-z}}$$

where
Z=−6.8384+DD10*2.934+DD30*2.3662+DD60*1.5721+ DD100*0.9368+DD150*0.3467+min_DT_I*1.0288+min_ price_I*0.3095+0.1758*r_inventory+0.0654*perks+ 3.6415*r_DT+0.5079*r_defending_champ+ 2.2467*r_price−0.1204*dealer_cnt__120−1.5562*DT_ Price+0.2872*r_zip_sale+0.3175*same_state+ 0.1961*r_CR−0.1303*DT_diff+7.819*pct_offset_diff− 0.1316*dealer_cnt__30+1.7942*make_id27−0.0964* dealer_cnt__60−0.0332*make_id26_d− 0.7554*make_id27_d−0.0147*make_id40_d

TABLE 5

| dealership_id | $P_c$ | DSA Rank | Display |
|---|---|---|---|
| 3730 | 0.512 | 1 | Yes |
| 6895 | 0.030 | 4 | No |
| 7708 | 0.022 | 6 | No |
| 8086 | 0.025 | 5 | No |
| 8502 | 0.012 | 7 | No |
| 9054 | 0.212 | 2 | Yes |
| 9756 | 0.064 | 3 | Yes |

In this non-limiting example, dealers "3730", "9054", and "9756" from Table 4 are selected for presentation to the consumer c based on their DSA ranking. FIG. 5 depicts an example where the selected dealers may be presented or displayed on a display of a client device associated with the potential customer. As one skilled in the art will appreciate, although dealership "8086" had the lowest price for the product, it was not included in the highest ranking dealerships because of other attributes, such as distance to the customer.

In some embodiments, the potential revenue that a parent organization may receive as a result of a transaction between a dealer i and a consumer c may be taken into consideration. For example, suppose an expected revenue associated with dealer "9756" is substantially less than an expected revenue associated with dealer "6895", dealer "6895" may be selected for presentation to the consumer c, even though dealer "9756" has a higher DSA ranking than dealer "6895".

In some embodiments, an individual dealer's expected revenue ER can be calculated using the following:

$$ER = P_c \cdot R_g \cdot \theta_n$$

where ER represents an expected revenue from a lead, $P_c$ represents a probability of closing the sale, $R_g$ represents a gross revenue generated from a sale, and $\theta_n$ represents a net revenue adjustment. In one embodiment, gross revenue $R_g$ may be generated from a linear regression model. In various embodiments, gross revenue $R_g$ may be determined depending on a business model of a parent company, a multiplicative model, or any other type of model.

As a non-limiting example, gross revenue $R_g$ may be expressed as follows:

$$R_g = X\beta$$

where the β coefficients are determined from the least-squares regression and the X matrix consists of variables chosen to isolate differences in estimated revenue.

Specifically, the revenue equation may be expressed as follows:
$R_g = \beta_o$
  $+\beta_{1,i} \times$indicator for make of vehicle being purchased,
    $\forall i$, where i represents the vehicle make
  $+\beta_2 \times$(if transaction type=Lease)
  $+\beta_3 \times$(if transaction type=Finance)
  $+\beta_4 \times$(if trade-in present)
  $+\beta_5 \times$(indicator for new car)
  $+\beta_{6,k} \times$(indicator for affinity partner)
    $\forall k$, where k represents the affinity partner In one embodiment, all gross revenues thus calculated are multiplied by their net payment ratio to account for differences in payment likelihood per dealership. To accomplish this, a separate multiplication factor, $\theta_n$, can be applied, where $\theta_n$ is to be estimated as the net payment ratio. Note that $\theta_n$ may be calculated based on a series of variables in a linear regression, or may be a simpler factor, such as a rolling 12-month window of payment history for the given dealer. For instance, for dealer Z, the total of the bills charged (by an intermediary entity such as the TrueCar system implementing the invention disclosed herein) to dealer Z over the past 12 months might be $10000, but their total payments (due to charge backs and/or failure to pay, etc.) might have only been $7800. So, for dealer Z in this example, their net payment ratio would be $\theta_n = 0.78$.

These components can then be put together (e.g., by a DSA module) to obtain the expected revenue ER (ER=$P_c \cdot R_g \cdot \theta_n$) that the intermediary can anticipate by displaying a certain dealer to this particular consumer based on the customer's (lead) specific vehicle request.

Therefore, it is not only the consumer who might benefit from the DSA disclosed herein by reducing searching time and money but additionally an intermediary may also benefit. Furthermore, vendors can also benefit from the DSA disclosed herein. For example, a dealer can adjust their specific characteristic in order to increase close rate, better manage their inventory by reducing storage cost, and/or increase stock by avoiding potential loss of short of products.

In some embodiments of the DSA, each dealer's own expected revenue in local area L (within a 60 ml driving distance radius) can be computed using the following formula:

$$ER_{i,L} = \left[ \sum_{t=1}^{T} \sum_{s \geq t}^{T} \sigma_{t,s} n_{i,s} \pi_{i,s} \sum_{z=1}^{Z_L} P_{i,t,z} d_{t,z} \right]$$

where $d_{t,z}$ is the demand for trim t in ZIP Code z; $n_{i,t}$ is the inventory of trim t at dealer i; $\pi_{i,t}$ is the revenue per closed sale (which may be constant across all trims/dealer pairs or different), and $\sigma_{t,s}$ reflects the substitutability across trims. For example, if a user becomes a prospect for vehicle trim A, there is a possibility that he/she may actually buy vehicle trim B. The substitutability occurs when the buyer is presented with an onsite inventory that may differ from his/her online searches.

Independent variables that might influence the sale of a vehicle are included in the variable selection process. Price offset(s) are transformed to the percentage over the invoice price to let the price offset at same scale among different car makers. Dealer related features are rescaled within one cohort to reflect their effect compared to other dealers. Certain non-rescaled variables can also be included to avoid overestimating the best price or closest dealer effect on sale when the best and worst price does not differ too much or the closest or furthest dealers are both located in about the same rang of distance. The final model(s) can be chosen by maximizing the percentage of concordance in the logistic regression so that the resulting estimate probability of sale can be the most consistent with the actual observed sales actions given the dealers displayed historically.

Various types of cross validations may be applied to the DSA model. For example, the final dataset can be randomly split into two groups for A-B testing and also separated into two parts according to two time windows.

Embodiments of the DSA disclosed herein can also be applied to the dealer side by ranking the customers according to the probability of buying a vehicle from the dealer. In certain embodiments, all the dealer features can be fixed and the probability of sale can be based on the customer's features such as: their household income, gender, and car make choice, distance to the dealer, customer loyalty, customer local dealer density and so on. Demographic information such as average income, average household size, and historical dealer preference for the population from the same ZIP code would be a good estimation input for each unique cohort. The probability of sale of a trim t to a certain customer c among a group of interested customer U can be calculated by the following function:

$$P_b = P_{c,t} = \frac{1}{1 + e^{-\delta_{c,t}}}$$

Examples of potential variables are as follow:
$\delta_{c,t} = \alpha_o$
{Features of individual customer, c}
$\alpha_1 \times$ the household income of customer c
$\alpha_2 \times$ the family size of customer c
$\alpha_3 \times$ customer c's household size
$\alpha_4 \times$ customer's local dealer density
$\alpha_5 \times$ if the customer will trade in an old car
$\alpha_6 \times$ the payment type of the customer c (e.g., cash or finance)
{Features describing the interaction of customer c and dealer}
$\alpha_7 \times$ distance from customer c to the dealer
$\alpha_8 \times$ if customer c bought from the dealer before
$\alpha_9 \times$ dealer's number of sales in customer c's ZIP code
$\alpha_{10} \times$ if customer c is in the same state as the dealer
$+\epsilon_{c,t,i}$ Once the customers are ranked by the probability of buying from the dealer, the sales person can better allocated their effect and time by reaching those customers with a higher chance of buying first. More advertising and marketing effort should target at those population and areas with a high probability of buying.

Figure 7:
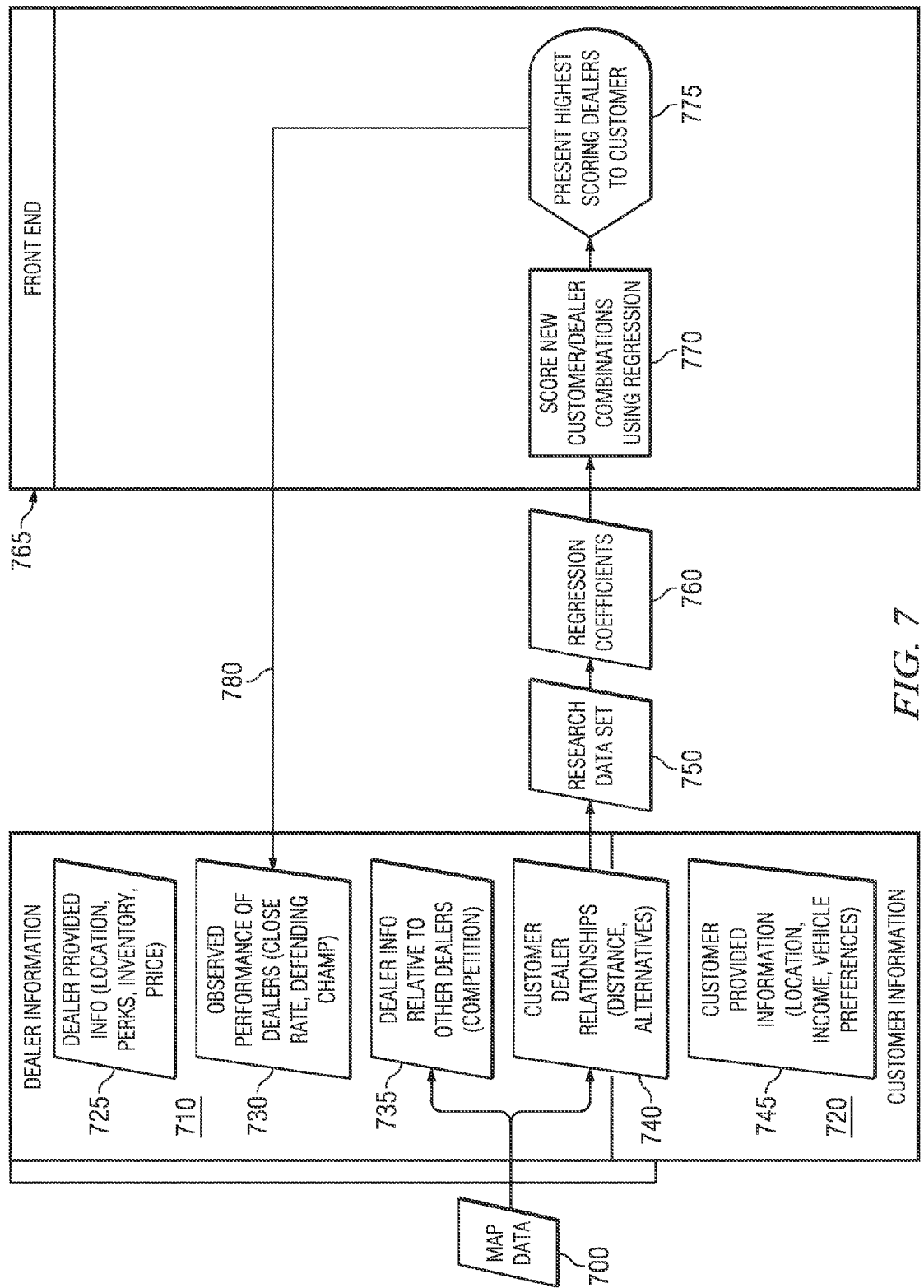
FIG. 7 depicts a diagrammatic representation of one example embodiment of a method of presenting sales outlets to a customer.

FIG. 7 depicts an example embodiment of a method of using a DSA model. Map data 700 may be a data mapping between dealer information 710 and customer information 720 created from a plurality of sources, such as information associated with dealers 710 and information associated with potential customers 720.

Dealer information 710 may include information that was provided by a dealer 725, observed performance of dealers 730, and dealer information relative to other dealers 735. Dealer provided information 725 may be included information such as a location, perks, inventory, and pricing of products sold by each respective dealer in a set of dealers. This information may be provided by and/or communicated from each of the individual dealers. However, if a dealer is not in a network or does not otherwise provide dealer information 725, then dealer information 725 may be gathered or obtained via a web search, from manufacturer data, or any other source.

Observed performance of dealers 730 may be associated with performance of an individual dealer such as a dealer's close rate. Initially, observed performance of dealers 730 may be set as a research data set or module, such as the DSA model as discussed above. As more data is gathered or collected and communicated via feedback loop 780, this information may be used to update and/or modify observed performance of dealers 730. More specifically, the research data set may be a set of coefficients and variables initially based on empirical data, and based on further interactions with potential customers and dealers the coefficients and variables may be adjusted, updated and/or modified. Accordingly, as more data such as dealer information 710 and/or customer information 720 is accumulated, an updated DSA model may be determined, which may adjust the observed performance of dealers 730.

Dealer information 710 may also include dealer information relative to other dealers (competition) 735. This information may be based in part on dealer provided information 725 associated with dealers that are stored in a database and online party third map services. This data may be normalized data of one dealer within a geographic region against other dealers within the geographic region. For example, if a first dealer has a price for a specific product, an incremental relationship may be determined comparing the price of the specific product at the first dealer to a price of the specific product at other dealers within the geographic region. Similarly, dealer information relative to other dealers 725 may include a normalized drive time to each dealer within a geographic region. The geographic region may be either a radial distance from the potential customer, a geographic region associated with a drive time from a potential customer, and/or a geographic region including a threshold number of potential dealers. For example, the geographic region may include a threshold number of dealers within a drive time distance from the potential customer. An example range of such a threshold number may be from 6 to 10. In an embodiment, dealer information relative to other dealers may be updated dynamically, on a daily, weekly, and/or monthly basis.

Customer information 720 may be information associated with potential customers. For example, customer information 720 may include information pertaining to customer dealer relationships 740, such as drive time from a potential customer to a specific dealer or a number of alternative dealers within a geographic region associated with a location of the potential customer.

Customer information 720 may also include information customer provided information 745, such as a location of the potential customer, an income of the potential customer, and vehicle preferences that may include make/model/trim of the potential customer. In an embodiment, customer information 720 may be obtained by a potential customer directly entering data in a web form on a Web site. In another embodiment, customer information 720 may be obtained via a partnership organization such as Yahoo® or AAA®, which may have previously obtained and mapped customer information 720 such as age, gender, income and location from a potential customer. In another embodiment, customer information 720 may be obtained via a third party. In this embodiment, any information obtained from a customer such as demographic information, contact information and the like may be transmitted to the third party. The third party may then map or compare the transmitted customer information 720 against their database and communicate any additional customer information 720.

Research data set 750 may include a researched data set based on statistical methodology associated with dealer information 710 and customer information 720. Regression coefficients 760 may then be set based on the statistical methodology to determine research data set 750 and a logistic regression approach. More so, regression coefficients 760 may be set at a moment in time, however as dealer information 710 and customer information 720 are updated, modified or changed research data set 750 and regression coefficients 760 may correspondingly be modified.

Front end 765 represents a front end use of a DSA model associated with a specific potential customer. Using the determined regression coefficients 760, the DSA model may determine scores for customer/dealer combinations 770 for each dealer within a set. Then, in the front end 765, the highest scoring dealers 775 may be presented to the customer 775. Furthermore, information associated with regression coefficients 760 may then be communicated on feedback loop 780 to update and/or modify the observed performance of dealers 730.

Figure 8:
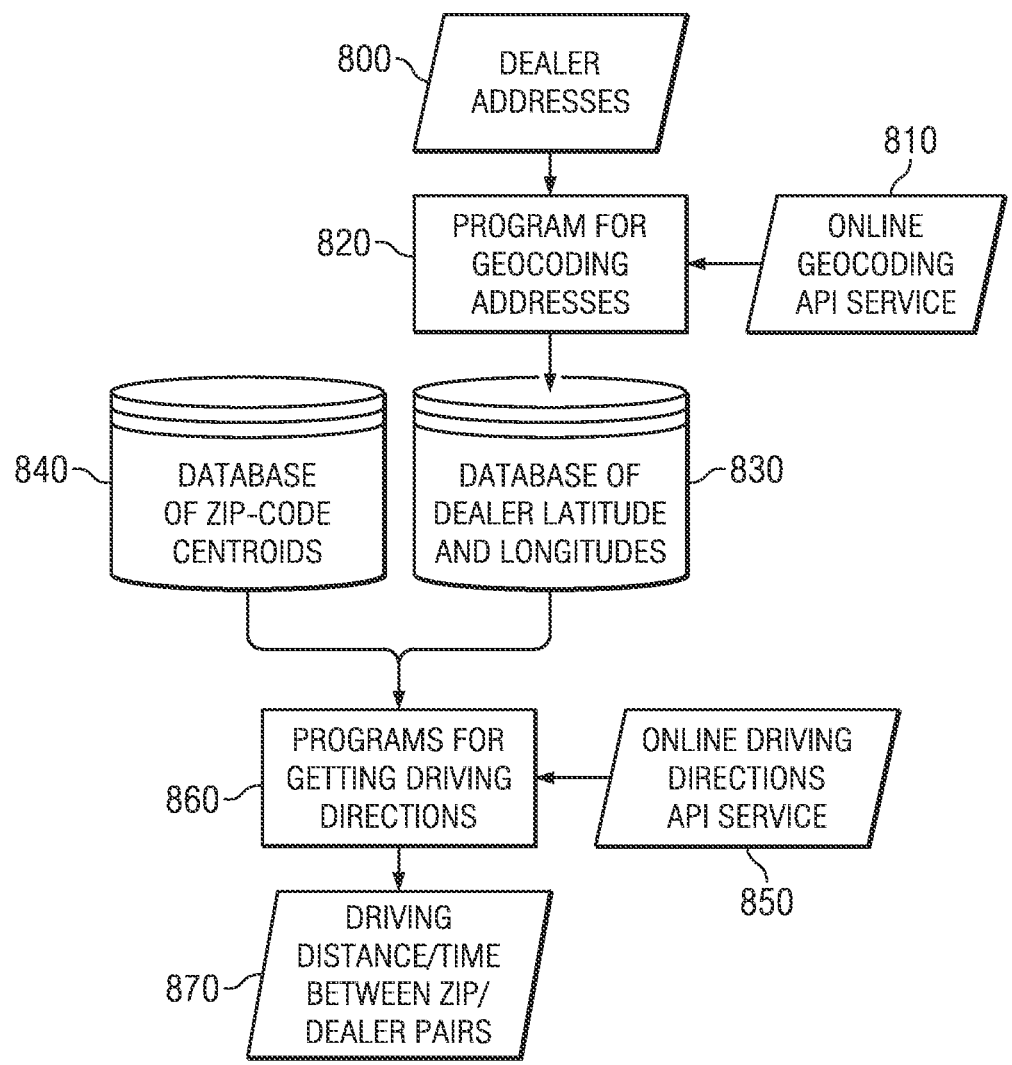
FIG. 8 depicts a diagrammatic representation of one example embodiment of a method of generating a drive distance/time for zip code-dealer pairs.

FIG. 8 depicts an example embodiment for determining a drive time distance for a dealer within a network. A dealer may supply the network with the address of the dealer 820. Utilizing an online geocoding API service 810, the geocoded address for the dealer 820 may be determined. The geocoded address of the dealer 820 including the dealer's latitude may then be stored in a database 830. More so, database 830 may include each dealer's within the network geocoded address. A database may include zip-codes centroids 840 associated with zip codes surrounding the dealer. Using an online directions API service 850 and the zip-code center centroids 840, driving directions from the zip-code centroids 840 from the geocoded address of the deal stored in database 830 may be determined. Further, the number driving directions to unique zip-code centroids from the geocoded address of the dealer may be based on empirical evidence associated with the geographic location of the dealer. For example, in one embodiment, driving directions 860 from a dealer may be determined for 6-10 zip-code centroids. Utilizing the driving directions 860, a drive distance/time between the zip-code centroid/dealer pairs 870 may be determined. In further embodiments, this procedure may be repeated each time a new dealer is added to the network.

Figure 9:
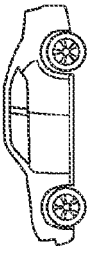
FIG. 9 depicts a diagrammatic representation of a screenshot displayed on a client device.

FIG. 9 depicts another example of how a consumer may interact with an embodiment implementing the DSA disclosed herein through a user interface on a client device. Webpage 900 may include forms 910 associated with customer information that may be entered or completed by a user, the closest dealers TrueCar certified dealers to the potential customer, and a target price for a specific trim of a vehicle in a geographic region.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A system, comprising:
   at least one processor;
   non-transitory computer memory; and
   stored instructions translatable by the at least one processor, the stored instructions when translated by the at least one processor perform:
   for each vendor in a set of vendors:
      determining a first probability of a vendor selling a product to a user interested in purchasing the product given that the vendor is presented in the set of vendors;
      determining a second probability of the user buying the product from the vendor given a historical preference of the user;
      determining a third probability of closing a sale where the third probability is a function of the first and second probabilities; and
      determining an expected revenue using the third probability;
   filtering the set of vendors based at least in part on the expected revenue to produce a filtered list of vendors, the filtered list of vendors comprising a subset of the set of vendors; and
   presenting the filtered list of vendors to the user interested in purchasing the product via a user interface on a user device associated with the user.

2. The system of claim 1, wherein the filtered list of vendors presented to the user is sorted based at least in part on the third probability associated with each vendor in the filtered list of vendors.

3. The system of claim 1, wherein the filtered list of vendors presented to the user is sorted based at least in part on an expected vendor revenue associated with each vendor in the filtered list of vendors.

4. The system of claim 1, wherein the filtered list of vendors presented to the user is sorted based at least in part on an expected entity revenue associated with an entity not in the filtered list of vendors.

5. The system of claim 1, wherein the expected revenue is determined based at least in part on a substitutability associated with the product.

6. The system of claim 1, wherein the first probability is determined based at least in part on features of the vendor relative to other vendors in a geographic region.

7. The system of claim 1, wherein the second probability is determined based at least in part on historical sales between the vendor and other users in a geographic region.

8. A method, comprising:
   at a computer having at least one processor, non-transitory computer memory, and stored instructions translatable by the at least one processor:
   for each vendor in a set of vendors:
      determining a first probability of a vendor selling a product to a user interested in purchasing the product given that the vendor is presented in the set of vendors;
      determining a second probability of the user buying the product from the vendor given a historical preference of the user;
      determining a third probability of closing a sale where the third probability is a function of the first and second probabilities; and
      determining an expected revenue using the third probability;
   the computer filtering the set of vendors based at least in part on the expected revenue to produce a filtered list of vendors, the filtered list of vendors comprising a subset of the set of vendors; and
   the computer presenting the filtered list of vendors to the user interested in purchasing the product via a user interface on a user device associated with the user.

9. The method according to claim 8, wherein the filtered list of vendors presented to the user is sorted based at least in part on the third probability associated with each vendor in the filtered list of vendors.

10. The method according to claim 8, wherein the filtered list of vendors presented to the user is sorted based at least in part on an expected vendor revenue associated with each vendor in the filtered list of vendors.

11. The method according to claim 8, wherein the filtered list of vendors presented to the user is sorted based at least in part on an expected entity revenue associated with an entity not in the filtered list of vendors.

12. The method according to claim 8, wherein the expected revenue is determined based at least in part on a substitutability associated with the product.

13. The method according to claim 8, wherein the first probability is determined based at least in part on features of the vendor relative to other vendors in a geographic region; and wherein the second probability is determined based at least in part on historical sales between the vendor and other users in the geographic region.

14. A computer program product comprising at least one non-transitory computer readable medium storing instructions translatable by at least one processor to perform:
   for each vendor in a set of vendors:
      determining a first probability of a vendor selling a product to a user interested in purchasing the product given that the vendor is presented in the set of vendors;
      determining a second probability of the user buying the product from the vendor given a historical preference of the user;
      determining a third probability of closing a sale where the third probability is a function of the first and second probabilities; and
      determining an expected revenue using the third probability;
   filtering the set of vendors based at least in part on the expected revenue to produce a filtered list of vendors, the filtered list of vendors comprising a subset of the set of vendors; and
   presenting the filtered list of vendors to the user interested in purchasing the product via a user interface on a user device associated with the user.

15. The computer program product of claim 14, wherein the filtered list of vendors presented to the user is sorted based at least in part on the third probability associated with each vendor in the filtered list of vendors.

16. The computer program product of claim 14, wherein the filtered list of vendors presented to the user is sorted based at least in part on an expected vendor revenue associated with each vendor in the filtered list of vendors.

17. The computer program product of claim 14, wherein the filtered list of vendors presented to the user is sorted based at least in part on an expected entity revenue associated with an entity not in the filtered list of vendors.

18. The computer program product of claim 14, wherein the expected revenue is determined based at least in part on a substitutability associated with the product.

19. The computer program product of claim 14, wherein the first probability is determined based at least in part on features of the vendor relative to other vendors in a geographic region.

20. The computer program product of claim 14, wherein the second probability is determined based at least in part on historical sales between the vendor and other users in a geographic region.

* * * * *